(12) United States Patent
Bergelin et al.

(10) Patent No.: US 11,904,588 B2
(45) Date of Patent: Feb. 20, 2024

(54) VENEERED ELEMENT AND METHOD OF PRODUCING SUCH A VENEERED ELEMENT

(71) Applicant: Välinge Innovation AB, Viken (SE)

(72) Inventors: Marcus Bergelin, Lerberget (SE); Göran Ziegler, Viken (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/038,567

(22) Filed: Sep. 30, 2020

(65) Prior Publication Data

US 2021/0008863 A1     Jan. 14, 2021

Related U.S. Application Data

(63) Continuation of application No. 15/496,357, filed on Apr. 25, 2017, now Pat. No. 10,828,881.

(30) Foreign Application Priority Data

Apr. 25, 2016   (SE) .................... 1650551-3

(51) Int. Cl.
  B32B 37/12        (2006.01)
  B32B 21/14        (2006.01)
  (Continued)

(52) U.S. Cl.
  CPC ............... B32B 37/12 (2013.01); B32B 3/06 (2013.01); B32B 3/10 (2013.01); B32B 3/20 (2013.01);
  (Continued)

(58) Field of Classification Search
  None
  See application file for complete search history.

(56) References Cited

U.S. PATENT DOCUMENTS

| 2,018,712 A | 10/1935 | Elmendorf |
| 2,419,614 A | 4/1947 | Welch |

(Continued)

FOREIGN PATENT DOCUMENTS

| AU | 80284/75 | 6/1975 |
| AU | 2011236087 A1 | 10/2011 |

(Continued)

OTHER PUBLICATIONS

U.S. Appl. No. 14/593,458, Goran Ziegler, filed Jan. 9, 2015 (Cited herein as US Patent Application Publication No. 2015/0197943 A1 of Jul. 16, 2015).

(Continued)

*Primary Examiner* — Christopher T Schatz
(74) *Attorney, Agent, or Firm* — Boone IP Law

(57) ABSTRACT

A method for the generation of a gas mixture comprising carbon monoxide, carbon dioxide and optionally hydrogen for use in hydroformylation plants or in carbonylation plants, including mixing an optional steam with carbon dioxide in the desired molar ratio, feeding the resulting gas to a solid oxide electrolysis cell (SOEC) or an SOEC stack at a sufficient temperature for the cell or cell stack to operate while effecting a partial conversion of carbon dioxide to carbon monoxide and optionally of steam to hydrogen, removing some or all the remaining steam from the raw product gas stream by cooling the raw product gas stream and separating the remaining product gas from a liquid, and using said gas mixture containing CO and $CO_2$ for liquid phase synthesis reactions utilizing carbon monoxide as one of the reactants while recycling $CO_2$ to the SOEC or SOEC stack.

15 Claims, 2 Drawing Sheets

(51) Int. Cl.

| | | |
|---|---|---|
| *B32B 21/13* | (2006.01) | |
| *B32B 21/06* | (2006.01) | |
| *B32B 21/10* | (2006.01) | |
| *B32B 5/02* | (2006.01) | |
| *B32B 7/12* | (2006.01) | |
| *B32B 38/08* | (2006.01) | |
| *B32B 13/10* | (2006.01) | |
| *B32B 19/06* | (2006.01) | |
| *B32B 29/02* | (2006.01) | |
| *B32B 9/04* | (2006.01) | |
| *B32B 13/14* | (2006.01) | |
| *B32B 29/00* | (2006.01) | |
| *B32B 27/40* | (2006.01) | |
| *B32B 3/10* | (2006.01) | |
| *B32B 3/06* | (2006.01) | |
| *B32B 9/00* | (2006.01) | |
| *B32B 21/08* | (2006.01) | |
| *B32B 27/30* | (2006.01) | |
| *B32B 3/20* | (2006.01) | |
| *B32B 7/04* | (2019.01) | |
| *B32B 19/04* | (2006.01) | |
| *B32B 27/12* | (2006.01) | |
| *B32B 13/08* | (2006.01) | |
| *B32B 9/06* | (2006.01) | |
| *B32B 21/02* | (2006.01) | |
| *B32B 27/10* | (2006.01) | |
| *B32B 3/26* | (2006.01) | |
| *B32B 5/26* | (2006.01) | |

(52) U.S. Cl.
CPC ............... *B32B 3/26* (2013.01); *B32B 5/022* (2013.01); *B32B 5/26* (2013.01); *B32B 7/04* (2013.01); *B32B 7/12* (2013.01); *B32B 9/005* (2013.01); *B32B 9/042* (2013.01); *B32B 9/047* (2013.01); *B32B 9/06* (2013.01); *B32B 13/08* (2013.01); *B32B 13/10* (2013.01); *B32B 13/14* (2013.01); *B32B 19/042* (2013.01); *B32B 19/046* (2013.01); *B32B 19/06* (2013.01); *B32B 21/02* (2013.01); *B32B 21/06* (2013.01); *B32B 21/08* (2013.01); *B32B 21/10* (2013.01); *B32B 21/13* (2013.01); *B32B 21/14* (2013.01); *B32B 27/10* (2013.01); *B32B 27/12* (2013.01); *B32B 27/304* (2013.01); *B32B 27/40* (2013.01); *B32B 29/005* (2013.01); *B32B 29/02* (2013.01); *B32B 37/1207* (2013.01); *B32B 37/1284* (2013.01); *B32B 38/08* (2013.01); *B32B 2037/1215* (2013.01); *B32B 2250/02* (2013.01); *B32B 2250/03* (2013.01); *B32B 2250/05* (2013.01); *B32B 2255/08* (2013.01); *B32B 2255/24* (2013.01); *B32B 2255/26* (2013.01); *B32B 2260/021* (2013.01); *B32B 2260/026* (2013.01); *B32B 2260/028* (2013.01); *B32B 2260/046* (2013.01); *B32B 2262/06* (2013.01); *B32B 2262/062* (2013.01); *B32B 2262/065* (2013.01); *B32B 2262/067* (2013.01); *B32B 2262/10* (2013.01); *B32B 2264/06* (2013.01); *B32B 2264/062* (2013.01); *B32B 2264/065* (2013.01); *B32B 2264/067* (2013.01); *B32B 2264/10* (2013.01); *B32B 2264/102* (2013.01); *B32B 2264/104* (2013.01); *B32B 2264/108* (2013.01); *B32B 2307/10* (2013.01); *B32B 2307/212* (2013.01); *B32B 2307/302* (2013.01); *B32B 2307/402* (2013.01); *B32B 2307/4026* (2013.01); *B32B 2307/50* (2013.01); *B32B 2307/536* (2013.01); *B32B 2307/546* (2013.01); *B32B 2307/554* (2013.01); *B32B 2307/558* (2013.01); *B32B 2307/584* (2013.01); *B32B 2307/72* (2013.01); *B32B 2307/7265* (2013.01); *B32B 2307/732* (2013.01); *B32B 2317/12* (2013.01); *B32B 2317/16* (2013.01); *B32B 2419/00* (2013.01); *B32B 2419/04* (2013.01); *B32B 2479/00* (2013.01); *B32B 2607/00* (2013.01)

(56) References Cited

U.S. PATENT DOCUMENTS

| | | |
|---|---|---|
| 2,587,064 A | 2/1952 | Rapson |
| 2,630,395 A | 3/1953 | Mccullough |
| 2,634,534 A | 4/1953 | Brown |
| 2,695,857 A | 11/1954 | Lewis et al. |
| 2,720,478 A | 10/1955 | Hogg |
| 2,831,793 A | 4/1958 | Elmendorf |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward |
| 3,673,020 A | 6/1972 | Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,263,373 A | 4/1981 | McCaskey, Jr. et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A | 2/1984 | Hönel |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann et al. |
| 5,147,486 A | 9/1992 | Hoffman |
| 5,206,066 A | 4/1993 | Horacek |

(56) References Cited

U.S. PATENT DOCUMENTS

| | | |
|---|---|---|
| 5,246,765 A | 9/1993 | Lussi et al. |
| 5,258,216 A | 11/1993 | Von Bonin et al. |
| 5,292,576 A | 3/1994 | Sanders |
| 5,314,554 A | 5/1994 | Owens |
| 5,354,259 A | 10/1994 | Scholz et al. |
| 5,405,705 A | 4/1995 | Fujimoto et al. |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B1 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,678,425 B2 | 3/2010 | Oldorff |
| 7,811,489 B2 | 10/2010 | Pervan |
| 7,918,062 B2 | 4/2011 | Chen |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 11,313,123 B2 | 4/2022 | Pervan et al. |
| 11,318,726 B2 | 5/2022 | Pervan et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0042180 A1* | 3/2003 | Kairi ................ B07C 5/14 209/518 |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0157519 A1* | 8/2004 | Goodell ............... B32B 5/24 442/181 |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers et al. |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Laurent et al. |
| 2006/0172118 A1 | 8/2006 | Han et al. |

(56) References Cited

U.S. PATENT DOCUMENTS

| | | |
|---|---|---|
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0027501 A1 | 2/2011 | Guo |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0078305 A1 | 3/2021 | Schulte |
| 2021/0101310 A1 | 4/2021 | Lindgren et al. |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |
| 2022/0063326 A1 | 3/2022 | Persson et al. |

FOREIGN PATENT DOCUMENTS

| | | |
|---|---|---|
| CH | 298894 A | 5/1954 |
| CN | 1709717 A | 12/2005 |
| CN | 102166775 A | 8/2011 |
| CN | 202200608 U | 4/2012 |
| CN | 104084994 A | 10/2014 |
| DE | 1 815 312 A1 | 7/1969 |
| DE | 7148789 U | 4/1972 |
| DE | 29 39 828 A1 | 4/1981 |

(56) References Cited

FOREIGN PATENT DOCUMENTS

| | | |
|---|---|---|
| DE | 33 34 921 A1 | 4/1985 |
| DE | 36 34 885 A1 | 4/1988 |
| DE | 42 33 050 A1 | 4/1993 |
| DE | 42 36 266 A1 | 5/1993 |
| DE | 202 14 532 U1 | 2/2004 |
| DE | 102 45 914 A1 | 4/2004 |
| DE | 103 00 247 A1 | 7/2004 |
| DE | 103 31 657 A1 | 2/2005 |
| DE | 20 2006 007 797 U1 | 8/2006 |
| DE | 10 2005 046 264 A1 | 4/2007 |
| DE | 10 2006 024 593 A1 | 12/2007 |
| DE | 10 2006 058 244 A1 | 6/2008 |
| DE | 10 2007 043 202 A1 | 3/2009 |
| DE | 20 2009 008 367 U1 | 9/2009 |
| DE | 10 2010 045 266 A | 3/2012 |
| DE | 20 2013 011 776 U1 | 7/2014 |
| DE | 20 2014 102 031 U1 | 7/2014 |
| DE | 20 2013 012 020 U1 | 2/2015 |
| DE | 10 2013 113 125 A1 | 5/2015 |
| EP | 0 129 430 A2 | 12/1984 |
| EP | 0 234 220 A2 | 9/1987 |
| EP | 0 129 430 B1 | 1/1990 |
| EP | 0 355 829 A2 | 2/1990 |
| EP | 0 592 013 A2 | 4/1994 |
| EP | 0 611 408 A1 | 8/1994 |
| EP | 0 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 0 993 934 A2 | 4/2000 |
| EP | 1 035 255 A1 | 9/2000 |
| EP | 1 125 971 A1 | 8/2001 |
| EP | 1 136 251 A2 | 9/2001 |
| EP | 1 209 199 A1 | 5/2002 |
| EP | 1 249 322 A1 | 10/2002 |
| EP | 1 262 607 A1 | 12/2002 |
| EP | 1 454 763 A2 | 9/2004 |
| EP | 1 242 702 B1 | 11/2004 |
| EP | 1 498 241 A2 | 1/2005 |
| EP | 1 584 378 A1 | 10/2005 |
| EP | 1 657 055 A1 | 5/2006 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 119 550 A1 | 11/2009 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 2 353 861 A1 | 8/2011 |
| EP | 1 847 385 B1 | 9/2011 |
| EP | 2 263 867 B1 | 3/2012 |
| EP | 2 902 196 A1 | 8/2015 |
| EP | 2 902 196 B1 | 8/2015 |
| EP | 2 902 196 B1 | 8/2016 |
| FR | 801 433 A | 8/1936 |
| FR | 2 873 953 A1 | 2/2006 |
| GB | 785008 | 10/1957 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | S51-128409 A | 11/1976 |
| JP | S52-087212 A | 7/1977 |
| JP | S53-148506 | 12/1978 |
| JP | S56-049259 A | 5/1981 |
| JP | S56-151564 A | 11/1981 |
| JP | S58-084761 A | 5/1983 |
| JP | S59-101312 A | 6/1984 |
| JP | S64-062108 A | 3/1989 |
| JP | H02-188206 A | 7/1990 |
| JP | H02-198801 A | 8/1990 |
| JP | H02-229002 A | 9/1990 |
| JP | H03-030905 A | 2/1991 |
| JP | H03-211047 A | 9/1991 |
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | H07-060704 A | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-086107 A | 4/1998 |
| JP | 2925749 B2 | 7/1999 |
| JP | H11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 2004/050359 A1 | 6/2004 |
| WO | WO 2004/067874 A2 | 8/2004 |
| WO | WO 2005/035209 A2 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/042651 A1 | 4/2006 |
| WO | WO 2006/043893 A1 | 4/2006 |
| WO | WO 2006/126930 A1 | 11/2006 |
| WO | WO 2007/042258 A1 | 4/2007 |
| WO | WO 2007/059294 A2 | 5/2007 |
| WO | WO 2008/004960 A2 | 1/2008 |

(56) References Cited

FOREIGN PATENT DOCUMENTS

| WO | WO 2008/148771 A1 | 12/2008 |
| --- | --- | --- |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/087752 A1 | 8/2010 |
| WO | WO 2011/058233 A1 | 5/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2013/079950 A1 | 6/2013 |
| WO | WO 2013/167576 A2 | 11/2013 |
| WO | WO 2013/182191 A2 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/105455 A1 | 7/2015 |
| WO | WO 2015/105456 A1 | 7/2015 |
| WO | WO 2015/174909 A1 | 11/2015 |
| WO | WO 2016/151435 A1 | 9/2016 |

OTHER PUBLICATIONS

U.S. Appl. No. 15/183,424, Darko Pervan, filed Jun. 15, 2016, (Cited herein as US Patent Application Publication No. 2016/0369507 A1 of Dec. 22, 2016).

U.S. Appl. No. 15/039,748, Guido Schulte, filed May 26, 2016 (Cited herein as US Patent Application Publication No. 2016/0375674 A1 of Dec. 29, 2016).

U.S. Appl. No. 16/132,977, Darko Pervan, filed Sep. 17, 2018, (Cited herein as US Patent Application Publication No. 2019/0010711 A1 of Jan. 10, 2019).

U.S. Appl. No. 16/223,708, Göran Ziegler, filed Dec. 18, 2018, (Cited herein as US Patent Application Publication No. 2019/0210329 A1 of Jul. 11, 2019).

U.S. Appl. No. 16/365,764, Christer Lundblad, filed Mar. 27, 2019, (Cited herein as US Patent Application Publication No. 2020/0055287 A1 of Feb. 20, 2020).

U.S. Appl. No. 16/738,334, Anette Hedlund, filed Jan. 9, 2020, (Cited herein as US Patent Application Publication No. 2020/0215799 A1 of Jul. 9, 2020).

U.S. Appl. No. 17/090,511, Guido Schulte, filed Nov. 5, 2020, (Cited herein as US Patent Application Publication No. 2021/0078305 A1 of Mar. 18, 2021).

U.S. Appl. No. 17/202,836, Göran Ziegler, filed Mar. 16, 2021.

U.S. Appl. No. 17/205,469, Göran Ziegler, filed Mar. 18, 2021.

U.S. Appl. No. 17/202,836, Ziegler et al.—See Information Below.

U.S. Appl. No. 17/205,469, Ziegler et al.—See Information Below.

Ziegler, Göran, et al., U.S. Appl. No. 17/202,836 entitled "Method to Produce a Veneered Element and a Veneered Element," filed in the U.S. Patent and Trademark Office Mar. 16, 2021.

Ziegler, Göran, et al., U.S. Appl. No. 17/205,469 entitled "Method of Producing a Veneered Element," filed in the U.S. Patent and Trademark Office Mar. 18, 2021.

U.S. Appl. No. 17/352,942, Guido Schulte, filed Jun. 21, 2021.

Schulte, Guido, U.S. Appl. No. 17/352,942 entitled "Method for Producing a Floorboard," filed in the U.S. Patent and Trademark Office on Jun. 21, 2021.

U.S. Appl. No. 17/232,687, Andreas Slottemo, filed Apr. 16, 2021.

U.S. Appl. No. 17/232,687, Slottemo et al.—See Information Below.

Slottemo, Andreas, et al., U.S. Appl. No. 17/232,687 entitled "Method for Producing a Building Element, a Pressing Device and a Method of Embossing a Wooden Surface," filed in the U.S. Patent and Trademark Office on Apr. 16, 2021.

International Search Report and Written Opinion, dated Jun. 13, 2017 in PCT/SE2017/050407, ISA/SE, Patent-och registreringsverket, Stockholm, SE, 18 pages.

Extended European Search Report issued in EP 17790016.4, dated Nov. 20, 2019, 7 pages, European Patent Office, Munich, DE.

Engstrand, Ola (Contact)/Välinge Innovation, Technical Disclosure entitled "Fibre Based Panels With a Wear Resistance Surface," Nov. 17, 2008, IP.com No. IPCOM000176590D, IP.com PriorArtDatabase, 76 pages.

Engstrand, Ola (Contact)/Välinge Innovation, Technical Disclosure entitled "WFF Embossing," May 15, 2009, IP.com No. IPCOM000183105D, IP.com PriorArtDatabase, 36 pages.

Engstrand, Ola (Contact)/Välinge Innovation, Technical Disclosure entitled "VA063 VA064 Scattering and Powder Backing," Nov. 11, 2011, IP.com No. IPCOM000212422D, IP.com PriorArtDatabase, 34 pages.

BTLSR Toledo, Inc. website. http://www.btlresins.com/more.html. "Advantages to Using Powdered Resins," May 26, 2007, 2 pages, per the Internet Archive WayBackMachine.

Fang, Chang-Hua, et al., "Densification of wood veneers by compression combined with heat and steam," *Eur. J. Wood Prod.*, 2012, pp. 155-163, vol. 70, Springer-Verlag, Germany (available online Feb. 1, 2011).

Floor Daily, "Shaw Laminates: Green by Design," Aug. 13, 2007, 1 pg, Dalton, GA.

Le Fur, X., et al., "Recycling melamine-impregnated paper waste as board adhesives," published online Oct. 26, 2004, pp. 419-423, vol. 62, Springer-Verlag, DE, XP055332791.

Lstiburek, Joseph, "BSD-106: Understanding Vapor Barriers," Apr. 15, 2011, *Building Science Corporation*, pp. 1-18; (retrieved Sep. 26, 2018 https://buildingscience.com/documents/digests/bsd-106-understanding-vapor-barriers).

Mercene Labs, official home page, retrieved Feb. 23, 2017, 3 pages, retrieved from the Internet: http://www.mercenelabs.com/technology/, according to the Internet Archive WayBack Machine this page was available on Jan. 22, 2013.

Nimz, H.H., "Wood," Ullmann's Encyclopedia of Industrial Chemistry, published online Jun. 15, 2000, pp. 453-505, vol. 39, Wiley-VCH Verlag Gmbh & Co. KgaA, Weinheim, DE.

Odian, George, "Principles of Polymerization," 1991, $3^{rd}$ Edition, 5 pages incl. pp. 122-123, John Wiley & Sons, Inc., New York, Ny, USA.

Parquet International, "Digital Printing is still an expensive process," Mar. 2008, cover page/pp. 78-79, www.parkettmagazin.com.

Nilsson, Magnus, et al., U.S. Appl. No. 17/543,962 entitled "Method to Produce a Veneered Element and a Veneered Element," filed in the U.S. Patent and Trademark Office Dec. 7, 2021.

U.S. Appl. No. 17/496,441, Göran Ziegler, filed Oct. 7, 2021.

Ziegler, Göran, et al., U.S. Appl. No. 17/496,441 entitled "Method to Produce a Veneered Element and a Veneered Element," filed in the U.S. Patent and Trademark Office on Oct. 7, 2021.

U.S. Appl. No. 17/697,417, Göran Ziegler, filed Mar. 17, 2022.

U.S. Appl. No. 17/711,487, Darko Pervan, filed Apr. 1, 2022.

U.S. Appl. No. 17/769,594, Rickard Rittinge, filed Apr. 15, 2022.

U.S. Appl. No. 17/747,325, Göran Ziegler, filed May 18, 2022.

Ziegler, Göran, et al., U.S. Appl. No. 17/697,417 entitled "Method to Produce a Building Panel and a Building Panel," filed in the U.S. Patent and Trademark Office Mar. 17, 2022.

Pervan, Darko, et al., U.S. Appl. No. 17/711,487 entitled "Wood Fibre Based Panel with a Surface Layer," filed in the U.S. Patent and Trademark Office Apr. 1, 2022.

Rittinge, Rickard, et al., U.S. Appl. No. 17/769,594 entitled "Wood Fibre Based Panel and a Method for Obtaining Such Panel," filed in the U.S. Patent and Trademark Office Apr. 15, 2022.

Ziegler, Göran, et al., U.S. Appl. No. 17/747,325 entitled "Method of Producing a Veneered Element," filed in the U.S. Patent and Trademark Office on May 18, 2022.

* cited by examiner

VENEERED ELEMENT AND METHOD OF PRODUCING SUCH A VENEERED ELEMENT

CROSS REFERENCE TO RELATED APPLICATIONS

The present application is a continuation of U.S. application Ser. No. 15/496,357, filed on Apr. 25, 2017, which claims the benefit of Swedish Application No. 1650551-3, filed on Apr. 25, 2016. The entire contents of U.S. application Ser. No. 15/496,357 and Swedish Application No. 1650551-3 are hereby incorporated herein by reference in their entirety.

TECHNICAL FIELD

Embodiments of the present invention relate to a veneered element and a method of producing such a veneered element comprising a wood veneer layer.

TECHNICAL BACKGROUND

Veneer layers may be used as a construction material, for example in the form of plywood. Plywood is formed of several veneer layers being glued together, for example with urea formaldehyde or phenol formaldehyde. The veneer layers are glued to each other in low pressure method at a temperature of about 140° C. and at a pressure about 10 bar. After pressing, the glue is present as a thin layer between the veneer layers. The veneer layers retain their original properties, including swelling and temperature expansion.

Veneer layers may also be used as a surface covering in panels. WO 2015/105455 discloses a building panel having a surface layer comprising a wood veneer and a sub-layer comprising wood fibres and a binder arranged between the surface layer and a wood fibre based core. In the surface layer, material from the sub-layer extends into the wood veneer.

WO 2015/105456 discloses a method of producing a veneered element, wherein a sub-layer permeates through a veneer layer and a design of the veneer layer is controlled by the permeation.

SUMMARY

It is an object of at least embodiments of the present invention to provide an improvement over the above described techniques and known art.

A further object of at least embodiments of the present invention is to provide a veneered element having a wood veneer layer with increased surface hardness compared to a convention wood veneer.

A further object of at least embodiments of the present invention is to provide a veneered element having a wood veneer layer with increased wear resistance compared to a convention wood veneer.

A further object of at least embodiments of the present invention is to provide a veneered element having a wood veneer layer with increased water resistance compared to a convention wood veneer.

A further object of at least embodiments of the present invention is to provide a veneered element having a wood veneer layer that may be lacquered.

At least some of these and other objects and advantages that will be apparent from the description have been achieved by a veneered element according to a first aspect of the invention. The veneered element comprises a substrate, a wood veneer layer having a first surface and a second surface, the first surface being opposite to the second surface, an adhesive layer adapted to adhere the first surface of the wood veneer layer to a surface of the substrate, wherein adhesive from the adhesive layer is present in a first portion of the wood veneer layer, extending from the first surface of the wood veneer layer into the wood veneer layer, and wherein the second surface of the wood veneer layer is substantially free from adhesive from the adhesive layer.

The veneered element may be a panel.

By the second surface of the wood veneer layer being substantially free from adhesive from the adhesive layer is meant that 70%, preferably at least 80%, such as at least 90%, of the surface of the second surface of the wood veneer layer is free from adhesive from the adhesive layer.

A minor part, such as less than 20%, such as less than 10% such as less than 5%, depending of wood specie, veneer production method, etc., of the surface of the second surface of the wood veneer layer is formed by pores or tracheids of the wood veneer layer. Since only a minor part of the second surface is formed by pores or tracheids, a second surface that is substantially free from adhesive from the adhesive layer may have less than 40% of the pores or tracheids extending into the second surface of the wood veneer layer filled with adhesive from the adhesive layer up to the second surface of the wood veneer layer. Preferably, less than 30% of the pores or tracheids extending into the second surface of the wood veneer layer are filled with adhesive from the adhesive layer up to the second surface of the wood veneer layer, and more preferably less than 20% of the pores or tracheids extending into the second surface of the wood veneer layer are filled with adhesive from the adhesive layer up to the second surface of the wood veneer layer.

Preferably, the pores or tracheids at the second surface of the wood veneer layer are substantially free from any adhesive, such as at least 60% of the pores or tracheids are free from adhesive, preferably at least 70%, more preferably at least 80% such as at least 90% of the pores or tracheids.

By pores are meant pores formed by vessel elements of angiosperms such as hardwood being cut such that hollow channels are formed. By tracheids are meant elongated cells in the xylem of gymnosperms such as softwood. Larger structures such as cracks and/or holes in the veneer are not included in the term pores or tracheids. Cracks and/or holes in the veneer may be at least partly filled with adhesive from the adhesive layer.

An advantage of at least embodiments of the first aspect is that properties such as hardness, wear resistance, and/or water resistance are improved by the adhesive from the adhesive reinforcing the wood veneer. The Brinell hardness of the wood veneer layer, as measured in accordance with EN 1534, after pressing is preferably higher than the Brinell hardness as measured on the wood veneer layer prior to pressing.

An advantage of having the second surface of the wood veneer layer being substantially free from adhesive from the adhesive layer is that adherence to further layers such as putty and/or coating or lacquer layers is improved. The surface may be substantially free from adhesive that may impair adherence to further layers. Wood putty may be applied to fill any holes and/or cracks of the wood veneer.

In one embodiment, a second portion of the wood veneer layer, the second portion extending from the second surface of the wood veneer layer and into the wood veneer layer, may be substantially free from adhesive from the adhesive layer. Thereby, adherence to further layers such as putty and/or coating or lacquer layers is further improved, as the second portion is substantially free from adhesive that may impair adherence to further layers.

Since only a minor part, such as less than 20%, such as less than 10%, such as less than 5%, depending of wood species, veneer production method, etc., of the wood in the wood veneer layer is formed by pores or tracheids, substantially free from adhesive from the adhesive layer may have less than 40% of the pores or tracheids of the wood veneer layer in the second portion at least partly filled with adhesive from the adhesive layer. Preferably, less than 30% of the pores or tracheids of the wood veneer layer in the second portion are at least partly filled with adhesive from the adhesive layer, and more preferably less than 20% of the pores or tracheids of the wood veneer in the second portion are at least partly filled with adhesive from the adhesive layer.

Preferably, the pores or tracheids at the second portion of the wood veneer layer are substantially free from any adhesive, such as at least 60% of the pores or tracheids are free from adhesive, preferably at least 70%, more preferably at least 80% such as at least 90% of the pores or tracheids. On at least 60%, preferably at least 70% such as at least 80% of the surface of the second surface of the wood veneer layer, wood fibres of the wood veneer layer may be free from adhesive from the adhesive layer.

In one embodiment, the wood veneer layer may be compressed to a thickness being less than or equal to 80% of its original thickness. By the wood veneer layer being compressed, the hardness of the wood veneer is increased. Further, by obtaining a denser wood veneer layer, impact, such as from footsteps, may result in a more dull sound and improved sound absorbance.

In one embodiment, the second portion may extend into at least 10% of the thickness of the wood veneer layer. A corresponding second portion of the wood veneer layer, which is substantially free of adhesive, may extend into 90% or less of the thickness of the wood veneer layer. By the first portion comprising adhesive from the adhesive layer extending further into the wood veneer layer, the wood veneer layer is reinforced by the adhesive. Properties such as hardness, wear resistance, and/or water resistance are improved by the adhesive from the adhesive reinforcing the wood veneer.

In one embodiment, the second portion of the wood veneer layer may extend from the second surface of the wood veneer layer and into at least 70% of the thickness of the wood veneer layer, preferably into at least 80% of the thickness of the wood veneer layer, and more preferably into at least 90% of the thickness of the wood veneer layer. By the second portion being at least substantially free from adhesive extending into at least 70% of the thickness of the wood veneer layer, a major portion of the wood veneer layer remain unaffected by adhesive and in a flexible, compressed state. The second portion is not locked in a compressed state by the adhesive from the adhesive layer as in the first portion, but remains more flexible and allows, for example, the wood veneer layer to be more readily embossed. Further, the wood feeling of the wood veneer may be maintained by the second portion of the wood veneer layer being substantially free from adhesive. Additionally, adherence to further layers such as putty and/or coating or lacquer layers is further improved.

In one embodiment, the second portion of the wood veneer layer may extend from the second surface of the wood veneer layer and into at least 5% of the thickness of the wood veneer layer, preferably into at least 10% of the thickness of the wood veneer layer, and more preferably into at least 20% of the thickness of the wood veneer layer. By increasing the thickness of the second portion of the wood veneer layer, more wood is substantially free from adhesive from the adhesive layer, thereby improving adherence to further layers.

The second surface of the wood veneer layer may be abrasively machined, such as sanded. Thereby, the thickness of the second portion of the wood veneer may be diminished, such that the second portion may extend from the second surface of the wood veneer layer and into at least 0.5% of the thickness of the wood veneer layer, preferably into at least 2% of the thickness of the wood veneer layer, and more preferably into at least 5% such as at least 10% of the thickness of the wood veneer layer.

At least 60%, preferably at least 70%, such as at least 80%, of the surface of the second surface of the wood veneer layer, wood fibres of the wood veneer layer may be free from adhesive from adhesive layer after abrasive machining, such as sanding.

The first portion may extend into at least 20% of the thickness of the wood veneer layer, preferably into at least 30%, and more preferably into at least 40% of the thickness of the wood veneer layer, such as at least 50% of the thickness of the wood veneer layer. By increasing the thickness of the portion of the wood veneer layer including adhesive from the adhesive layer, the hardness, wear resistance, and/or water resistance of wood veneer layer may be improved.

In one embodiment, the second portion may extend into at least 0.5% of the thickness of the wood veneer layer and the first portion may extend no more than 99.5% of the thickness of the wood veneer layer. The second portion may extend into at least 2% of the thickness of the wood veneer layer and the first portion may extend no more than 98% of the thickness of the wood veneer layer. The second portion may extend into at least 5% of the thickness of the wood veneer layer and the first portion may extend no more than 95% of the thickness of the wood veneer layer.

In one embodiment, the second portion may extend into at least 70% of the thickness of the wood veneer, and the first portion may extend no more than 30% into the thickness of the wood veneer. The second portion may extend into at least 80% of the thickness of the wood veneer, and the first portion may extend no more than 20% into the thickness of the wood veneer.

The density of the wood veneer may be at least 1000 kg/m$^3$. The wood veneer layer may be formed of compressed wood veneer. By the wood veneer having a density of at least 1000 kg/m$^3$, or being compressed to a density of at least 1000 kg/m$^3$, the hardness of the wood veneer is increased. Further, by a more dense wood veneer layer, impact such as footsteps result in a more dull sound and improves sound absorbance.

The substrate may comprise at least one wood veneer layer. The substrate may comprise several wood veneer layers such as being plywood. Preferably, the veneered element includes uneven number of wood veneer layers. Preferably, the wood veneer layers are arranged crosswise. Preferably, in each of the wood veneer layers, the adhesive is present in a first portion of each wood veneer layer, extending from a first surface of each wood veneer layer and into at least 10%, preferably 20%, more preferably 30% such as 40%, of the thickness of each wood veneer layer. A plywood having improved hardness is thereby provided.

The substrate may comprise a wood-based panel. The wood-based panel may be selected from the group consisting of HDF, MDF, OSB, lamella core, and solid wood. The substrate may be a thermoplastic board. The substrate may comprise a thermoplastic material.

The substrate may comprise a sheet such as a paper sheet or sheet of non-woven.

The adhesive layer may comprise a resin impregnated paper. The resin impregnated paper may be impregnated with urea formaldehyde, phenol formaldehyde, melamine formaldehyde, or combination thereof. The paper may be impregnated with polyurethane. Resin from the resin impregnated paper has the function of adhesive and bonds the wood veneer layer to the substrate by means of the resin impregnated paper, and is present in the first portion of the wood veneer layer.

The adhesive layer may comprise a thermosetting binder. The thermosetting binder may be urea formaldehyde, phenol formaldehyde, melamine formaldehyde, polyurethane, polyester, emulsion polymer isocyanate (EPI), or combination thereof.

The adhesive layer may comprise a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The adhesive layer may comprise a hot melt or pressure sensitive adhesive.

Material from a primer, foil or sheet arranged on the second surface of the wood veneer layer may be present in pores or tracheids of the second surface. Material from a primer, foil or sheet arranged on the second surface of the wood veneer layer may be present in pores or tracheids of the second portion of the wood veneer layer. The material may be from a primer such as a print primer, a primer for preparing the wood veneer layer for lacquering, etc. The material may be a thermosetting resin from the foil or sheet, such as an overlay.

According to a second aspect of the present invention, a method of producing a veneered element is provided. The method may comprise:

providing a substrate and a wood veneer layer having a first surface and a second surface, the first surface being opposite to the second surface, arranging an adhesive layer on the substrate and/or on a first surface of the wood veneer layer, pressing the wood veneer layer to the substrate, wherein, after pressing, adhesive from the adhesive layer is present in a first portion of the wood veneer layer extending from the first surface of the wood veneer layer into the wood veneer layer, and wherein, after pressing, the second surface of the wood veneer layer is substantially free from adhesive from the adhesive layer.

The veneered element may be a panel.

By the second surface of the wood veneer layer being substantially free from adhesive from the adhesive layer is meant that 70%, preferably at least 80% such as at least 90% of the surface of the second surface of the wood veneer layer is free from adhesive from the adhesive layer.

A minor part, such as less than 20%, such as less than 10% such as less than 5%, depending of wood specie, veneer production method, etc., of the surface of the second surface of the wood veneer layer is formed by pores or tracheids of the wood veneer. Since only a minor part of the second surface is formed by pores or tracheids, a second surface that is substantially free from adhesive from the adhesive layer may have less than 40% of the pores or tracheids extending into the second surface of the wood veneer layer filled with adhesive from the adhesive layer up to the second surface of the wood veneer layer. Preferably, less than 30% of the pores or tracheids extending into the second surface of the wood veneer layer are filled with adhesive from the adhesive layer up to the second surface of the wood veneer layer, and more preferably less than 20% of the pores or tracheids extending into the second surface of the wood veneer layer are filled with adhesive from the adhesive layer up to the second surface of the wood veneer layer.

Preferably, the pores or tracheids at the second surface of the wood veneer layer are substantially free from any adhesive, such as at least 60% of the pores or tracheids are free from adhesive, preferably at least 70%, more preferably at least 80% such as at least 90% of the pores or tracheids.

By pores are meant pores formed by vessel elements of angiosperms such as hardwood being cut such that hollow channels are formed. By tracheids are meant elongated cells in the xylem of gymnosperms such as softwood. Larger structures such as cracks and/or holes in the veneer are not included in the term pores or tracheids. Cracks and/or holes in the veneer may be at least partly filled with adhesive from the adhesive layer.

An advantage of at least embodiments of the second aspect is that properties such as hardness, wear resistance, and/or water resistance are improved by the adhesive from the adhesive reinforcing the wood veneer. The Brinell hardness of the wood veneer layer, as measured in accordance with EN 1534, after pressing is preferably higher than the Brinell hardness as measured on the wood veneer layer prior to pressing. The adhesive in the first portion fixes the wood veneer in its compressed state even after pressing, such that the wood veneer remains compressed in thickness.

An advantage of having the second surface of the wood veneer layer being substantially free from adhesive from the adhesive layer is that adherence to further layers such as putty and/or coating or lacquer layers is improved. The surface may be substantially free from adhesive that may impair adherence to further layers. Wood putty may be applied to fill any holes and/or cracks of the wood veneer.

After pressing, a second portion of the wood veneer layer, the second portion extending from the second surface of the wood veneer layer and into the wood veneer layer, may be substantially free from adhesive from the adhesive layer. Thereby, adherence to further layers such as putty and/or coating or lacquer layers is further improved, as the second portion is substantially free form adhesive that may impair adherence to further layers.

Since only a minor part, such at less than 20%, such as less than 10% such as less than 5%, depending on the wood specie, veneer production method etc., of the wood in the wood veneer layer is formed by pores or tracheids, substantially free from adhesive from the adhesive layer may have that less than 40% of the pores or tracheids of the wood veneer in the second portion are at least partly filled with adhesive from the adhesive layer. Preferably, less than 30% of the pores or tracheids of the wood veneer in the second portion are at least partly filled with adhesive from the adhesive layer, and more preferably less than 20% of the pores or tracheids of the wood veneer in the second portion are at least partly filled with adhesive from the adhesive layer.

Preferably, the pores or tracheids at the second surface of the wood veneer layer are substantially free from any adhesive, such as at least 60% of the pores or tracheids are free from adhesive, preferably at least 70%, more preferably at least 80% such as at least 90% of the pores or tracheids, after pressing.

On at least 60%, preferably at least 70% such as at least 80% of the surface of the second surface of the wood veneer layer, wood fibres of the wood veneer layer may be free from adhesive from the adhesive layer.

In one embodiment, after pressing, the wood veneer layer may be compressed to a thickness being less than or equal to 80% of its thickness prior pressing. By the wood veneer layer being compressed, the hardness of the wood veneer is increased. Further, by obtaining a denser wood veneer layer, impact, such as from footsteps, may result in a more dull sound and improved sound absorbance.

In one embodiment, the first portion may extend into at least 10% of the thickness of the wood veneer layer after pressing. A corresponding second portion of the wood veneer layer, which is substantially free of adhesive, may extend into 90% of the thickness of the wood veneer layer. By the first portion comprising adhesive from the adhesive layer extending further into the wood veneer layer, the wood veneer layer is reinforced by the adhesive. Properties such as hardness, wear resistance, and/or water resistance are improved by the adhesive from the adhesive reinforcing the wood veneer.

In one embodiment, the second portion of the wood veneer layer may extend from the second surface of the wood veneer layer and into at least 70% of the thickness of the wood veneer layer, preferably into at least 80% of the thickness of the wood veneer layer, and more preferably into at least 90% of the thickness of the wood veneer layer after pressing. By the second portion being at least substantially free from adhesive extending into at least 70% of the thickness of the wood veneer layer, a major portion of the wood veneer layer remain unaffected by adhesive and in a flexible, compressed state. The second portion is not locked in a compressed state by the adhesive from the adhesive layer as in the first portion, but remains more flexible and allows, for example, the wood veneer layer to be readily embossed. Further, the wood feeling of the wood veneer may be maintained by the second portion of the wood veneer layer being substantially free from any adhesive. Additionally, adherence to further layers such as putty and/or coating or lacquer layers is further improved.

In one embodiment, the second portion of the wood veneer layer may extend from the second surface of the wood veneer layer and into at least 2% of the thickness of the wood veneer layer, preferably into at least 5% of the thickness of the wood veneer layer, and more preferably into at least 10% of the thickness of the wood veneer layer. By increasing the thickness of the second portion of the wood veneer layer, more wood is substantially free from adhesive from the adhesive layer, thereby improving adherence to further layers.

The method may further comprise abrasively machining the second surface of the wood veneer layer. The second surface of the wood veneer may be sanded. Thereby, the thickness of the second portion of the wood veneer may be diminished, such that the second portion may extend from the second surface of the wood veneer layer and into at least 0.5% of the thickness of the wood veneer layer, preferably into at least 2% of the thickness of the wood veneer layer, and more preferably into at least 5% of the thickness of the wood veneer layer.

On at least 60%, preferably at least 70% such as at least 80% of the surface of the second surface of the wood veneer layer, wood fibres of the wood veneer layer may be free from adhesive from adhesive layer after abrasive machining such as sanding.

The first portion may extend into at least 20% of the thickness of the wood veneer layer, preferably into at least 30%, and more preferably into at least 40% of the thickness of the wood veneer layer such at least 50% or the thickness of the wood veneer layer. By increasing the thickness of the portion of the wood veneer layer including adhesive from the adhesive layer, the hardness, wear resistance, and/or water resistance of wood veneer layer may be improved.

The second portion may extend into at least 0.5% of the thickness of the wood veneer layer and the first portion may extend no more than 99.5% of the thickness of the wood veneer layer. The second portion may extend into at least 2% of the thickness of the wood veneer layer and the first portion may extend no more than 98% of the thickness of the wood veneer layer. The second portion may extend into at least 5% of the thickness of the wood veneer layer and the first portion may extend no more than 95% of the thickness of the wood veneer layer.

In one embodiment, the second portion may extend into at least 70% of the thickness of the wood veneer, and the first portion may extend no more than 30% into the thickness of the wood veneer. The second portion may extend into at least 80% of the thickness of the wood veneer, and the first portion may extend no more than 20% into the thickness of the wood veneer.

In one embodiment, the wood veneer layer may be compressed to a thickness being less than or equal to 70% of its thickness prior to pressing, preferably to a thickness of less than or equal to 50% of its thickness prior to pressing. The wood veneer layer is compressed during pressing and the compressed state is substantially maintained after pressing. The adhesive in the adhesive layer fixes the wood veneer layer in the compressed state. Thereby, the hardness of the wood veneer layer is improved.

The wood veneer layer may have a density after pressing of at least 1000 kg/m$^3$.

Pressing the wood veneer layer to the substrate may comprise applying heat and pressure.

The pressure applied may be at least 15 bar. By applying pressure exceeding 15 bar, adhesive from the adhesive layer is pressed into the wood veneer, thereby reinforcing the wood veneer. The pressure may be applied during at least during 15 s, preferably during at least 30 s, more preferably during at least 45 s. The temperature may be at least 150° C., such as 150-200° C.

The substrate may comprise at least one wood veneer layer. The substrate may comprise several wood veneer layers such as being plywood. Preferably, the veneered element includes an uneven number of wood veneer layers. Preferably, the wood veneer layers are arranged crosswise. Preferably, in each of the wood veneer layers, the adhesive is present in a first portion of each wood veneer layer, extending from a first surface of each wood veneer layer and into at least 10%, preferably into at least 20%, more preferably into at least 30% such as into at least 40% such as into at least 50% of the thickness of each wood veneer layer. A plywood having improved hardness is thereby provided.

The substrate may comprise a wood-based panel. The wood-based panel may be selected from the group consisting of HDF, MDF, OSB, lamella core, and solid wood. The substrate may be a thermoplastic board. The substrate may comprise a thermoplastic material.

The substrate may comprise a sheet such as a paper sheet or non-woven.

The adhesive layer may comprise a resin impregnated paper. The resin impregnated paper may be impregnated with urea formaldehyde, phenol formaldehyde, melamine formaldehyde, or combination thereof. The paper may be impregnated with polyurethane. Resin from the resin impregnated paper has the function of adhesive and bonds the wood veneer layer to the substrate by means of the resin impregnated paper, and is present in the first portion of the wood veneer layer.

The adhesive layer may comprise a thermoplastic binder. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof. The adhesive layer may comprise a hot melt or pressure sensitive adhesive.

The adhesive layer may comprise a thermosetting binder. The thermosetting binder may be urea formaldehyde, phenol formaldehyde, melamine formaldehyde, polyurethane, polyester, emulsion polymer isocyanate (EPI), or combination thereof.

The adhesive may be applied in powder form. The thermosetting binder in powder form may be applied either on the substrate and/or on the first surface of the wood veneer layer.

The adhesive may be applied in liquid form. The thermosetting binder in liquid form may be applied either on the substrate and/or on the first surface of the wood veneer layer.

A primer, foil or sheet may be applied on the second surface of the wood veneer layer prior to pressing. The primer may be a print primer, a primer for preparing the wood veneer layer for lacquering, etc. The foil or sheet, such as an overlay, may be impregnated with a B staged thermosetting resin. During pressing, material from the primer, foil or sheet may be pressed into pores or tracheids of the second surface of the wood veneer layer. Thereby, a counteracting force is obtained, preventing adhesive from the adhesive layer from impregnating into the second surface of the wood veneer layer. The counteracting force may prevent adhesive from the adhesive layer from impregnating into the second portion of the wood veneer layer and will allow an increased amount of adhesive in the adhesive layer and/or allow for increased pressure to be applied such that the wood veneer layer is more thoroughly impregnated with adhesive from the adhesive layer without resulting in increased amount of adhesive from the adhesive layer being present at the second surface of the wood veneer layer.

According to a third aspect of the invention, a method of producing a veneered element is provided. The veneered element may comprise an uppermost wood veneer layer, at least one intermediate wood veneer layer, and a lowermost wood veneer layer, wherein the uppermost wood veneer layer having a first surface and a second surface, the first surface being opposite to the second surface, an adhesive layer adapted to adhere the first surface of the uppermost wood veneer layer to a surface of said at least one intermediate wood veneer layer, wherein adhesive from the adhesive layer is present in a first portion of the uppermost wood veneer layer, extending from the first surface of the uppermost wood veneer layer into the uppermost wood veneer layer, and wherein the second surface of the uppermost wood veneer layer is substantially free from adhesive from the adhesive layer.

The veneered element may be a panel.

By the second surface of the wood veneer layer being substantially free from adhesive from the adhesive layer is meant that 70%, preferably at least 80% such as at least 90% of the surface of the second surface of the wood veneer layer is free from adhesive from the adhesive layer.

A minor part, such as less than 20%, such as less than 10% such as less than 5%, of the surface, of the second surface of the wood veneer layer is formed by pores or tracheids of the wood veneer layer. Since only a minor part of the second surface is formed by pores or tracheids, a second surface that is substantially free from adhesive from the adhesive layer may have less than 40% of the pores or tracheids extending into the second surface of the wood veneer layer filled with adhesive from the adhesive layer up to the second surface of the wood veneer layer. Preferably, less than 30% of the pores or tracheids extending into the second surface of the wood veneer layer are filled with adhesive from the adhesive layer up to the second surface of the wood veneer layer, and more preferably less than 20% of the pores or tracheids at the second surface of the wood veneer layer are filled with adhesive from the adhesive layer up to the second surface of the wood veneer layer.

Preferably, the pores or tracheids at the second surface of the wood veneer layer are substantially free from any adhesive, such as at least 60% of the pores or tracheids are free from adhesive, preferably at least 70%, more preferably at least 80% such as at least 90% of the pores or tracheids.

By pores are meant pores formed by vessel elements of angiosperms such as hardwood being cut such that hollow channels are formed. By tracheids are meant elongated cells in the xylem of gymnosperms such as softwood. Larger structures such as cracks and/or holes in the veneer are not included in the term pores or tracheids. Cracks and/or holes in the veneer may be at least partly filled with adhesive from the adhesive layer.

An advantage of at least embodiments of the first aspect is that properties such as hardness, wear resistance, and/or water resistance are improved by the adhesive from the adhesive reinforcing the wood veneer. The Brinell hardness of the wood veneer, as measured in accordance with EN 1534, layer after pressing is preferably higher than the Brinell hardness as measured on the wood veneer layer prior to pressing.

An advantage of having the second surface of the wood veneer layer being substantially free from adhesive from the adhesive layer is that adherence to further layers such as putty and/or coating or lacquer layers is improved. The surface may be substantially free from adhesive that may impair adherence to further layers. Wood putty may be applied to fill any holes and/or cracks of the wood veneer.

In one embodiment, a second portion of the wood veneer layer, the second portion of the wood veneer layer extending from the second surface of the wood veneer layer and into the wood veneer layer, may be substantially free from adhesive from the adhesive layer. Thereby, adherence to further layers such as putty and/or coating or lacquer layers is further improved, as the second portion is substantially free from adhesive that may impair adherence to further layers.

Since only a minor part, such at less than 20%, such as less than 10% such as less than 5%, depending on wood specie, veneer production method, etc., of the wood in the wood veneer layer is formed by pores or tracheids, substantially free from adhesive from the adhesive layer may have less than 40% of the pores or tracheids of the wood veneer in the second portion at least partly filled with adhesive from the adhesive layer. Preferably, less than 30% of the pores or tracheids of the wood veneer in the second portion are at least partly filled with adhesive from the adhesive layer, and more preferably less than 20% of the pores or tracheids of the wood veneer in the second portion are at least partly filled with adhesive from the adhesive layer.

Preferably, the pores or tracheids at the second surface of the wood veneer layer are substantially free from any adhesive, such as at least 60% of the pores or tracheids are free from adhesive, preferably 70%, more preferably at least 80% such as at least 90% of the pores or tracheids. On at least 60%, preferably at least 70% such as at least 80% of the surface of the second surface of the wood veneer layer, wood fibres of the wood veneer layer may be free from adhesive from the adhesive layer.

In one embodiment, the uppermost wood veneer layer may be compressed to a thickness being less than or equal to 80% of its original thickness. By the wood veneer layer being compressed, the hardness of the wood veneer is increased. Further, by obtaining a denser wood veneer layer, impact, such as from footsteps, may result in a more dull sound and improved sound absorbance.

In one embodiment, the first portion may extend into at least 10% of the thickness of the uppermost wood veneer layer. A corresponding second portion of the wood veneer layer, which is substantially free of adhesive, may extend into 90% of less of the thickness of the wood veneer layer. By the first portion comprising adhesive from the adhesive layer extending further into the wood veneer layer, the wood veneer layer is reinforced by the adhesive. Properties such as hardness, wear resistance, and/or water resistance are improved by the adhesive from the adhesive reinforcing the wood veneer.

In one embodiment, the second portion of the uppermost wood veneer layer may extend from the second surface of the uppermost wood veneer layer and into at least 70% of the thickness of the uppermost wood veneer layer, preferably into at least 80% of the thickness of the uppermost wood veneer layer, and more preferably into at least 90% of the thickness of the uppermost wood veneer layer after pressing. By the second portion being at least substantially free from adhesive extending into at least 70% of the thickness of the wood veneer layer, a major portion of the wood veneer layer remain unaffected by adhesive and in a flexible, compressed state. The second portion is not locked in a compressed state by the adhesive from the adhesive layer as in the first portion, but remains more flexible and allows, for example, the wood veneer layer to be more readily embossed. Further, the wood feeling of the wood veneer may be maintained by the portion of the wood veneer layer being substantially free from adhesive. Additionally, adherence to further layers such as putty and/or coating or lacquer layers is further improved.

According to a fourth aspect of the invention, a method of producing a veneered element is provided. The method may comprise:

providing an uppermost wood veneer layer, at least one intermediate wood veneer layer, and a lowermost wood veneer layer, wherein the uppermost wood veneer layer having a first surface and a second surface, the first surface being opposite to the second surface, arranging an adhesive layer at least on said at least one intermediate wood veneer layer and/or on the first surface of the uppermost wood veneer layer, pressing the uppermost wood veneer layer, said at least one intermediate wood veneer layer, and the lowermost wood veneer layer together, wherein, after pressing, adhesive from the adhesive layer is present in a first portion of the uppermost wood veneer layer extending from the first surface of the wood veneer layer into the wood veneer layer, and wherein, after pressing, the second surface of the uppermost wood veneer layer is substantially free from adhesive from the adhesive layer.

The veneered element may be a panel.

By the second surface of the wood veneer layer being substantially free from adhesive from the adhesive layer is meant that 70%, preferably at least 80% such as at least 90% of the surface of the second surface of the wood veneer layer is free from adhesive from the adhesive layer.

A minor part, such as less than 20%, such as less than 10% such as less than 5%, depending on wood specie, veneer production method, etc., of the surface of the second surface of the wood veneer layer is formed by pores or tracheids of the wood veneer. Since only a minor part of the second surface is formed by pores or tracheids, a second surface that is substantially free from adhesive from the adhesive layer may have less than 40% of the pores or tracheids extending into the second surface of the wood veneer layer filled with adhesive from the adhesive layer up to the second surface of the wood veneer layer. Preferably, less than 30% of the pores or tracheids extending into the second surface of the wood veneer are filled with adhesive from the adhesive layer up to the second surface of the wood veneer layer, and more preferably less than 20% of the pores or tracheids extending into the second surface of the wood veneer are filled with adhesive from the adhesive layer up to the second surface of the wood veneer layer.

Preferably, the pores or tracheids at the second surface of the wood veneer layer are substantially free from any adhesive, such as at least 60% of the pores or tracheids are free from adhesive, preferably at least 70%, more preferably at least 80% such as at least 90% of the pores or tracheids.

By pores are meant pores formed by vessel elements of angiosperms such as hardwood being cut such that hollow channels are formed. By tracheids are meant elongated cells in the xylem of gymnosperms such as softwood. Larger structures such as cracks and/or holes in the veneer are not included in the term pores or tracheids. Cracks and/or holes in the veneer may be at least partly filled with adhesive from the adhesive layer.

An advantage of at least embodiments of the first aspect is that properties such as hardness, wear resistance, and/or water resistance are improved by the adhesive from the adhesive reinforcing the wood veneer. The Brinell hardness of the wood veneer layer, as measured in accordance with EN 1534, after pressing is preferably higher than the Brinell hardness as measured on the wood veneer layer prior to pressing.

An advantage of having the second surface of the wood veneer layer being substantially free from adhesive from the adhesive layer is that adherence to further layers such as putty and/or coating or lacquer layers is improved. The surface may be substantially free from adhesive that may impair adherence to further layers. Wood putty may be applied to fill any holes and/or cracks of the wood veneer.

In one embodiment, a second portion of the wood veneer layer, the second portion extending from the second surface of the wood veneer layer and into the wood veneer layer, may be substantially free from adhesive from the adhesive layer. Thereby, adherence to further layers such as putty and/or coating or lacquer layers is further improved, as the second portion is substantially free from adhesive that may impair adherence to further layers.

Since only a minor part, such as less than 20%, such as less than 10% such as less than 5%, of the wood in the wood veneer layer is formed by pores or tracheids, substantially free from adhesive from the adhesive layer may have less than 40% of the pores or tracheids of the wood veneer in the second portion at least partially filled with adhesive from the adhesive layer. Preferably, less than 30% of the pores or tracheids of the wood veneer in the second portion are at least partially filled with adhesive from the adhesive layer, and more preferably less than 20% of the pores or tracheids of the wood veneer in the second portion are at least partially filled with adhesive from the adhesive layer.

Preferably, the pores or tracheids at the second surface of the wood veneer layer are substantially free from any adhesive, such as at least 60% of the pores or tracheids are free from adhesive, preferably at least 70%, more preferably at least 80% such as at least 90% of the pores or tracheids. On at least 60%, preferably at least 70% such as at least 80% of the surface of the second surface of the wood veneer layer, wood fibres of the wood veneer layer may be free from adhesive from the adhesive layer.

In one embodiment, after pressing, the uppermost wood veneer layer may be compressed to a thickness being less than or equal to 80% of its thickness prior to pressing. By the wood veneer layer being compressed, the hardness of the wood veneer is increased. Further, by obtaining a denser wood veneer layer, impact, such as from footsteps, may result in a more dull sound and improves sound absorbance.

In one embodiment, the first portion may extend into at least 10% of the thickness of the uppermost wood veneer layer after pressing. A corresponding second portion of the wood veneer, which is substantially free from adhesive, may extend into 90% or less of the thickness of the wood veneer layer. By the first portion comprising adhesive from the adhesive layer extending further into the wood veneer layer, the wood veneer layer is reinforced by the adhesive. Properties such as hardness, wear resistance, and/or water resistance are improved by the adhesive from the adhesive reinforcing the wood veneer.

In one embodiment, after pressing the second portion of the uppermost wood veneer layer may extend from the second surface of the uppermost wood veneer layer and into at least 70% of the thickness of the uppermost wood veneer layer, preferably into at least 80% of the thickness of the uppermost wood veneer layer, and more preferably into at least 90% of the thickness of the uppermost wood veneer layer after pressing. By the second portion being at least substantially free from adhesive extending into at least 70% of the thickness of the wood veneer layer, a major portion of the wood veneer layer remain unaffected by adhesive and in a flexible, compressed state. The second portion is not locked in a compressed state by the adhesive from the adhesive layer as in the first portion, but remains more flexible and allows, for example, the wood veneer layer to be readily embossed. Further, the wood feeling of the wood veneer may be maintained by the second portion of the wood veneer layer being substantially free from adhesive. Additionally, adherence to further layers such as putty and/or coating or lacquer layers is further improved.

According to a fifth aspect of the invention, a method of producing a veneered element is provided. The method may comprise:

providing an uppermost wood veneer layer, at least one intermediate wood veneer layer, and a lowermost wood veneer layer, arranging an adhesive layer on the uppermost wood veneer layer and/or on said at least one intermediate wood veneer layer, and on said at least one intermediate wood veneer layer and/or on the lowermost wood veneer layer, respectively, pressing the wood veneer layers together, wherein, after pressing, adhesive from the adhesive layers is present in portions of said at least one intermediate wood veneer layer, wherein a thickness of each of said portions is at least 5% of the thickness of each of said at least one intermediate wood veneer layer, preferably at least 10% of the thickness of each of said at least one intermediate wood veneer layer, more preferably at least 15% of the thickness of each of said at least one intermediate wood veneer layer.

The total combined thickness of said portions may be at least 20%, preferably at least 40%, and more preferably at least 60% of the thickness of each of said at least one intermediate wood veneer layer.

Thereby, a high strength veneered element is obtained, with improved bending stiffness, hardness, wear resistance and/or water resistance.

By adhesive from the adhesive layer being present in portions of said at least one intermediate wood veneer layer is meant that pores or tracheids of the wood veneer layer are filled with adhesive from the adhesive layer. By pores are meant pores formed by vessel elements of angiosperms such as hardwood being cut such that hollow channels are formed. By tracheids are meant elongated cells in the xylem of gymnosperms such as softwood.

Adhesive from the adhesive layers may be present in a first portion of said at least one intermediate wood veneer layer, facing the uppermost wood veneer layer, and in a second portion of said at least one intermediate wood veneer layer, facing the lowermost wood veneer layer. The total thickness of the first and second portion may be at least 20%, preferably at least 40%, and more preferably at least 60% of the thickness of each of said at least one intermediate wood veneer layer.

The veneered element may be a plywood panel.

Said at least one intermediate layer may be compressed to a thickness of less or equal to 80% of its thickness prior to pressing, preferably less or equal to 70% of its thickness prior to pressing, and more preferably less or equal to 50% of its thickness prior to pressing. The uppermost and/or the lowermost wood veneer layer may be compressed to a thickness of less or equal to 80% of its thickness prior to pressing, preferably less or equal to 70% of its thickness prior to pressing, and more preferably less or equal to 50% of its thickness prior to pressing.

Adhesive may be present the uppermost and/or the lowermost wood veneer layer. Adhesive may be present at a surface of the uppermost and/or lowermost wood veneer layer, facing away from said at least one intermediate wood veneer layer. The surface of the uppermost and/or lowermost wood veneer layer, facing away from said at least one intermediate wood veneer layer, may be substantially free from adhesive from the adhesive layer.

According to a sixth aspect of the invention, a veneered element is provided. The veneered element comprises an uppermost wood veneer layer, at least one intermediate wood veneer layer, and a lowermost wood veneer layer, wherein and an adhesive layer is arranged between the uppermost wood veneer layer and said at least one intermediate wood veneer layer, and between said at least one intermediate wood veneer layer and the lowermost wood veneer layer, respectively, and wherein adhesive from the adhesive layers is present in portions of said at least one intermediate wood veneer layer, wherein a thickness of each of said portions is at least 5% of the thickness of each of said at least one intermediate wood veneer layer, preferably at least 10% of the thickness of each of said at least one intermediate wood veneer layer, more preferably at least 15% of the thickness of each of said at least one intermediate wood veneer layer.

The total combined thickness of said portions may be at least 20%, preferably at least 40%, and more preferably at least 60% of the thickness of each of said at least one intermediate wood veneer layer.

By adhesive from the adhesive layer being present in portions of said at least one intermediate wood veneer layer is meant that pores or tracheids of the wood veneer layer are filled with adhesive from the adhesive layer. By pores are meant pores formed by vessel elements of angiosperms such as hardwood being cut such that hollow channels are formed. By tracheids are meant elongated cells in the xylem of gymnosperms such as softwood.

Adhesive from the adhesive layers may be present in a first portion of said at least one intermediate wood veneer layer, facing the uppermost wood veneer layer, and in a second portion of said at least one intermediate wood veneer layer, facing the lowermost wood veneer layer. The total combined thickness of the first and second portion may be at least 20%, preferably at least 40%, and more preferably at least 60% of the thickness of each of said at least one intermediate wood veneer layer.

The density of said at least one intermediate wood veneer layer may be at least 1000 kg/m$^3$. The density of the lowermost and/or the uppermost wood veneer layer may be at least 1000 kg/m$^3$.

The veneered element may be a plywood panel.

Adhesive may be present the uppermost and/or the lowermost wood veneer layer. Adhesive may be present at a surface of the uppermost and/or lowermost wood veneer layer, facing away from said at least one intermediate wood veneer layer. The surface of the uppermost and/or lowermost wood veneer layer, facing away from said at least one intermediate wood veneer layer, may be substantially free from adhesive from the adhesive layer.

The distribution of the amount of adhesive may be applied symmetrically in a thickness direction of the wood veneer layers. In order to improve impact and water resistance properties, more adhesive may be applied in the adhesive layer adjacent the uppermost and the lowermost wood veneer layer compared to the amount of adhesive applied for the adhesive layer/layers between intermediate wood veneer layers. In order to improve obtain impregnation of the adhesive in the intermediate wood veneer layers and to improve adherence to further layer such as lacquer layer, more adhesive may be applied in the adhesive layer/layers between intermediate wood veneer layers compared to the amount of adhesive applied in the adhesive layer adjacent the uppermost and the lowermost wood veneer layer.

BRIEF DESCRIPTION OF THE DRAWINGS

The present invention will by way of example be described in more detail with reference to the appended schematic drawings, which show embodiments of the present invention.

DETAILED DESCRIPTION

Figure 1:
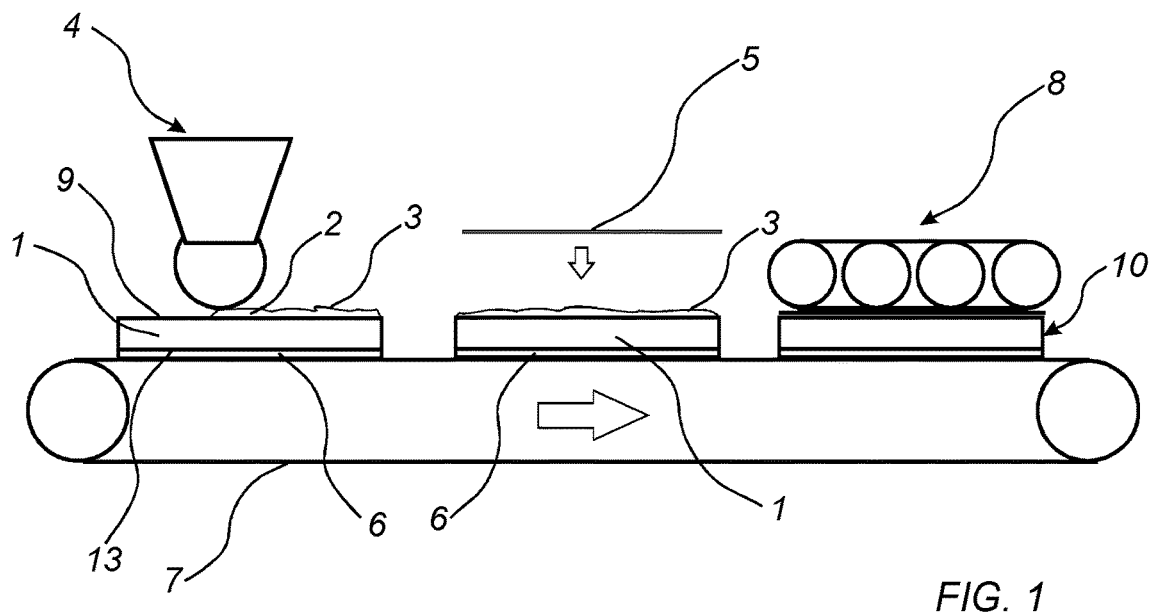
FIG. 1 shows a method of producing a veneered element.

FIG. 1 shows a method of producing a veneered element 10. The veneered element may be a panel. The veneered element or panel 10 may be, or form part of, a furniture component, a building panel such as a floor panel, a ceiling panel, a wall panel, a door panel, a worktop, skirting boards, mouldings, edging profiles, etc. The method includes providing a substrate 1. The substrate 1 is preferably a prefabricated substrate, produced prior to the method of producing the panel 10. The substrate 1 may be a panel, for example, a wood-based panel. The wood-based panel may be a wood fibre based panel such as MDF, HDF, particleboard, etc., or plywood. The substrate 1 may be a sheet of paper or non-woven. In other embodiments, the substrate 1 may be a Wood Plastic Composite (WPC). The substrate 1 may be a plastic board such as a thermoplastic board. The substrate 1 may be a mineral composite board. The substrate 1 may be a fibre cement board. The substrate 1 may be magnesium containing cement board. The substrate 1 may be a ceramic board.

As show FIG. 1, an adhesive 2 is applied on a first surface 9 of the substrate 1 such that an adhesive layer 3 is formed on the substrate 1. The adhesive 2 may be a thermosetting binder, a thermoplastic binder, or a combination of a thermosetting and thermoplastic binder. The thermosetting binder may be urea formaldehyde, phenol formaldehyde, melamine formaldehyde, polyurethane, polyester, emulsion polymer isocyanate (EPI), or combination thereof. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The adhesive 2 may be any type of glue. The adhesive 2 may be a hot melt. The adhesive 2 may be a pressure sensitive adhesive.

The adhesive 2 may be applied in liquid form or as a paste. The adhesive 2 may be applied by a roller, as shown FIG. 1. The adhesive 2 may be applied by spraying, roller coating, curtain coating, hot melt coating, etc.

The adhesive 2 may be applied in powder form, preferably in dry powder form. The adhesive 2 may be applied by scattering.

The adhesive 2 may be applied on the substrate 1 in form of a sheet or foil. The sheet may be impregnated with a binder as adhesive. The sheet may be paper sheet. The sheet may be a non-woven. The sheet may be coloured, and/or the binder solution used to impregnate the sheet may be coloured, such that sheet becomes coloured during impregnation.

The adhesive 2 may include fillers. The fillers may be particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres.

The fillers may be fillers having sound-absorbing properties such as cork particles and/or barium sulphate (BaSO$_4$). Alternatively, a sound-absorbing layer (not shown), for example a cork layer or cork veneer layer, may be arranged as an intermediate layer. The adhesive 2 may be applied on the sound-absorbing layer. The sound-absorbing layer may be arranged on the substrate 1, or on a sub-layer arranged on the substrate 1.

The adhesive 2 may further include pigments, wear resistant particles, and additives. The additives may be wetting agents, anti-static agents such as carbon black, and heat-conducting additives such as aluminium. Other possible additives are magnetic substances. Additives such as blowing agents may be included in the sub-layer. The blowing agents may be physical foaming agents such as EXPANCEL® and/or chemical blowing agents such as AIBN (azoisobutyronitrile) or ADC (azodicarbonamide). The wear and/or scratch resistant particles may be aluminium oxide particles and/or silica particles. In embodiments, fillers, pigments, wear resistant particles, additives etc. may be applied separately from the adhesive 2 and not be included in the adhesive 2.

The adhesive 2 may be applied in an amount corresponding to a dry resin content of 10-200 g/m², preferably in an amount of 10-150 g/m² such as 25-75 g/m².

On the adhesive layer 3, a wood veneer layer 5 is applied. The wood veneer layer 5 may have a porous structure. Pores are formed by vessel elements of angiosperms such as hardwood being cut such that hollow channels are formed. Tracheids are formed by elongated cells in the xylem of gymnosperms such as softwood. The wood veneer layer 5 may also comprise holes and cracks. The wood veneer layer 5 may have a thickness of about 0.2 to 4 mm, such as about 0.2 to 1 mm. The wood veneer layer 5 may be continuous or non-continuous. The wood veneer layer 5 may be formed of several veneer pieces, i.e. being non-continuous. The veneer pieces may be over-lapping or non-overlapping.

In a similar manner as described above, the adhesive 2 described above may be applied on a surface of the wood veneer layer 5 facing the substrate. The adhesive 2 may be applied both on the substrate 1 and on the wood veneer layer 5.

A balancing layer or counteracting layer 6 may be applied to a second surface 13 of the substrate 1, opposite the first surface 9. The balancing layer or counteracting layer 6 may be applied with an adhesive 2 as described above with reference to the wood veneer layer 5. The balancing layer or counteracting layer 6 may be a wood veneer layer. In the embodiment wherein the balancing layer or counteracting layer 6 is a wood veneer layer, and is adhered to the substrate with an adhesive as described above with reference to the wood veneer layer 5, the description and properties of the wood veneer layer 5 also applies to the balancing or counteracting layer 6. The balancing layer or counteracting layer 6 may be a powder based balancing layer being applied as a powder. The powder based balancing layer may comprise wood particles such as lignocellulosic and/or cellulosic particles and a binder, preferably a thermosetting binder such as an amino resin. The balancing layer or counteracting layer 6 may be a resin impregnated paper, preferably impregnated with a thermosetting binder.

When the wood veneer layer 5 is arranged on the adhesive layer 3 on the substrate 1, pressure is applied to the wood veneer layer 5 and/or the substrate 1. Preferably, heat is applied together with applying pressure. The pressure may be applied by continuous press 8 or in a discontinuous press (not shown). Pressure applied may be at least 15 bar. The pressure may be applied during at least 15 s, preferably during at least 30 s, more preferably during at least 45 s. The temperature may be at least 150° C., such as 150-200° C.

When applying pressure, the wood veneer layer 5 is adhered to the substrate 1 by the adhesive 2 such that a veneered element 10 in form of a panel is formed. The veneered element 10 or panel will be described in more detail below with reference to FIGS. 2A-B.

The adhesive 2 impregnates a first portion 11 of the wood veneer layer 5, facing the adhesive layer 3, during pressing. The impregnation of the adhesive 2 into the wood veneer layer 5 will be described in more detail below with reference to FIGS. 2A-B.

When pressing, the wood veneer layer 5 may be compressed. The wood veneer layer 5 may be compressed to a thickness being less or equal to 80% of its thickness prior to pressing, such as less or equal to 70%, such as less or equal to 50%, of its thickness prior to pressing. The density of the wood veneer layer may be at least 1000 kg/m³ after pressing. Due to the binder in the adhesive 2 impregnating into the first portion 11 of the wood veneer layer 5, the compression of wood veneer layer 5 is maintained, or substantially maintained after pressing to a thickness being less than 80% of the thickness of the wood veneer layer 5 prior to pressing. The binder in the adhesive 2, which impregnates into the first portion 11 of the wood veneer layer 5 during pressing, fixes the first portion 11 of the wood veneer layer 5 into its compressed state after pressing, when the binder in the adhesive layer 3 has harden or cured. By thickness of the wood veneer layer 5 is meant in this application the distance between the first and second surface 14, 15 of the wood veneer layer 5.

Figure 2A:
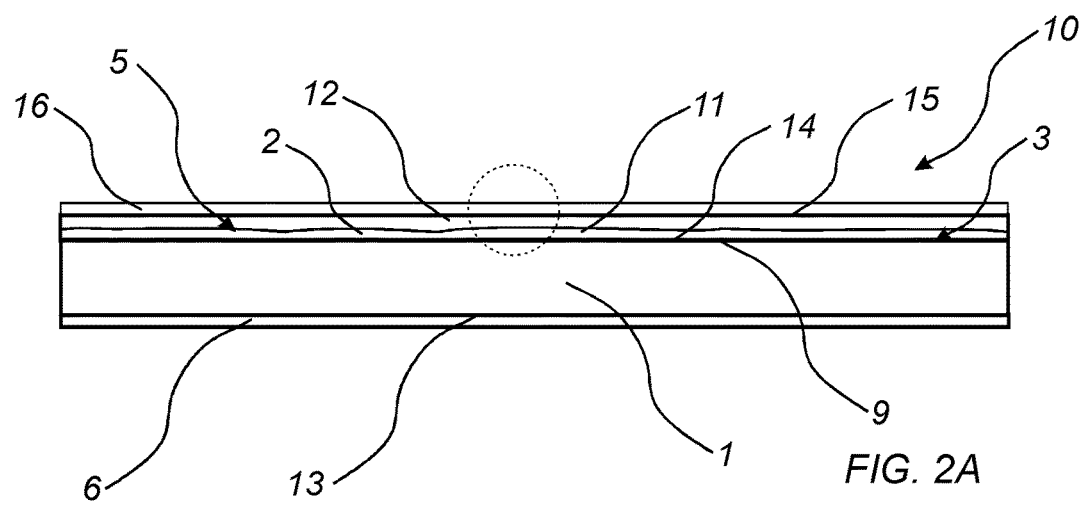
FIG. 2A shows a veneered element produced according to the method shown in FIG. 1.
Figure 2B:
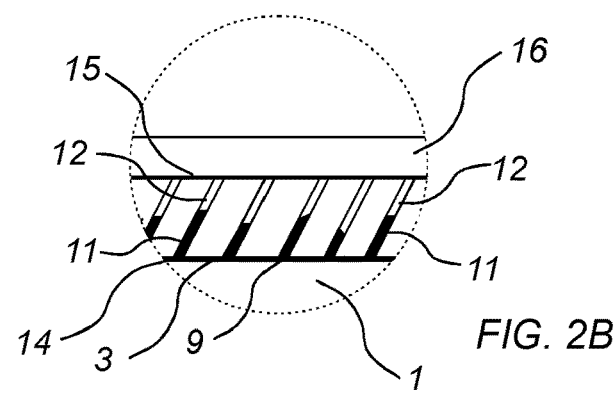
FIG. 2B shows an enlarged portion of the veneered element shown in FIG. 2A.

The veneered element 10 or panel formed by the method described in FIG. 1 will now be described in more detail with reference to FIGS. 2A-B. After pressing, the adhesive 2 has impregnated a first portion 11 of the wood veneer layer 5. The first portion 11 is extending from a first surface 14 of the wood veneer layer 5, facing the substrate 1, and into the wood veneer layer 5. The first portion 11 may extend from the first surface 14 into at least 10% of the thickness of the wood veneer layer 5. Preferably, the first portion 11 may extend from the first surface 14 into at least 20% of the thickness of the wood veneer layer 5, more preferably into at least 30%, most preferably at least 40%, of the thickness of the wood veneer layer 5. The adhesive 2 from the adhesive layer 3 has flowed through pores or tracheids of the wood veneer. The thickness of the wood veneer layer 5 referred to is measured after pressing.

The second surface 15 of the wood veneer layer 5 may be substantially free from adhesive 2 from the adhesive layer 3. The second surface 15 of the wood veneer layer 5 may be free from any adhesive or resin from the adhesive layer 3.

In one embodiment, a second portion 12 extending from a second surface 15 of the wood veneer layer 5, opposite the first surface 14, and into the wood veneer layer 5 may be substantially free from adhesive 2 from the adhesive layer 3. The second portion 12 of the wood veneer layer 5 may be free from any adhesive or resin from the adhesive layer 3.

By substantially free from adhesive 2 from the adhesive layer 3 is meant that less than 40% of the pores or tracheids of the wood veneer are at least partially filled with adhesive 2. Preferably, less than 30% of the pores or tracheids of the wood veneer are at least partially filled with adhesive 2, and more preferably less than 20% of the pores or tracheids of the wood veneer are at least partially filled with adhesive 2. Pores and tracheids only form a minor part, such as less than 20% such that less than 10% such that less than 5%, depending on wood specie, veneer production method, etc., of the material of the wood veneer. Larger openings than pores or tracheids in the wood veneer, such as cracks and holes, may be contain adhesive 2 from the adhesive layer 3, and may be at least be partially filled with adhesive 2. Cracks and holes are not considered as pores or tracheids.

The second portion 12 of the wood veneer layer 5, being substantially free from adhesive, preferably extends from the second surface 15 of the wood veneer layer 5 and into at least 5% of the thickness of the wood veneer layer 5. Preferably the second portion 12 is extending from the second surface 15 of the wood veneer layer 5 and into at least 10% of the thickness of the wood veneer layer 5, more preferably into at least 20% of the thickness of the wood veneer layer 5, and most preferably into at least 30% of the wood veneer layer 5. In one embodiment, the second portion 12 of the wood veneer layer 5 extends into at least 70% of the thickness of the wood veneer layer 5, such as at least 80% such as at least 90% of the thickness of the wood veneer layer 5. The thickness of the wood veneer layer 5 referred to is measured after pressing and prior to post-treatment, such as abrasive machining, such as sanding.

Consequently, the second surface 15 of the wood veneer layer 5 is substantially free from adhesive 2. Thereby, surface treatment of the second surface, such as coating and/or lacquering, is facilitated, since substantially no adhesive that may make adherence to the second surface of the wood veneer layer more difficult is present at the second surface.

It is contemplated that the balancing or counteracting layer 6 formed of a wood veneer layer may have a surface, or second surface portion, facing away from the substrate 1, being substantially free from adhesive 2 from the adhesive layer 3, and a first layer facing the substrate 1 containing adhesive 2 from the adhesive layer 3, in a similar manner as described above with reference to the wood veneer layer 5.

The second surface 15 of the wood veneer layer 5 may be treated prior to applying a protective layer. The second surface 15 may be abrasively machined. The second surface 15 may be sanded. Sanding is often performed prior to lacquering. If measured after abrasive machining such as sanding, the second surface 15 is substantially free from adhesive 2 from the adhesive layer 3. In one embodiment, if measured after abrasive machining such as sanding, the second portion 12 may extend from the second surface 15 of the wood veneer layer 5 and into at least 0.5% of the thickness of the wood veneer layer 5, preferably into at least 2% of the thickness of the wood veneer layer 5, and more preferably into at least 5% of the thickness of the wood veneer layer 5.

The second surface 15 of the wood veneer layer 5 may be provided with a protective layer. The second surface 15 of the wood veneer layer 5 may be coated with a coating 16, such as lacquered with one or more lacquer layers. The coating or lacquer 16 may be an acrylate or methacrylate coating such as polyurethane coating. The coating or lacquer 16 may comprise wear and/or scratch resistant particles. The protective layer may be an overlay paper comprising wear resistant particles (not shown). The protective layer may be a powder overlay, as described in WO2011/129755, comprising processed wood fibres, a binder and wear resistant particles applied as mix on the wood veneer layer (not shown). If the protective layer comprises or is an overlay paper or a powder overlay, the protective layer is preferably applied before applying pressure. Thereby, the protective layer is cured and attached to the wood veneer layer 5 in the same step as adhering the wood veneer layer 5 to the substrate 1.

The wood veneer layer 5 may further be treated in different ways, for example brushed, oiled, waxed, etc. A protective coating (not shown) may also be applied to the wood veneer layer 5 prior to pressing. In one embodiment, a wax powder is applied, for example, scattered, on the second surface 15 of the wood veneer layer 5, prior to pressing. During pressing, the wax powder forms a protective coating of the wood veneer layer 5.

In one embodiment, a primer, foil or sheet (not shown) is applied on the second surface 15 of the wood veneer layer 5, prior or after pressing. The primer may be a print primer, a primer for preparing the wood veneer layer 5 for lacquering, etc. The foil or sheet may be impregnated with a B staged thermosetting resin. If applied prior to pressing, material from the primer, foil or sheet may be pressed into pores or tracheids of the second surface 15 of the wood veneer layer 5 during pressing. Thereby, a counteracting force is obtained, preventing adhesive 2 from the adhesive layer 3 from impregnating into the second surface 15 of the wood veneer layer 5. The counteracting force may prevent adhesive 2 from the adhesive layer 3 from impregnating into the second portion 12 of the wood veneer layer 5.

A protective foil may also be applied on the second surface 15 of the wood veneer layer 5 prior or after pressing. The protective foil may be thermoplastic foil such as PU (polyurethane) or PVC (polyvinyl chloride) foil.

As described above, the wood veneer layer 5 is maintained compressed compared to its original thickness after pressing. The thickness of the wood veneer layer 5 after pressing may be less or equal to 80% of the thickness of the wood veneer layer 5 prior to pressing, and preferably less or equal to 70% of the thickness of the wood veneer layer 5 prior to pressing, and more preferably less or equal to 50% of the thickness of the wood veneer layer 5 prior to pressing.

The panel may be provided with a mechanical locking system for joining with an adjacent panel.

In one embodiment, for example when the wood veneer layer 5 is adhered to a substrate in form of a sheet such as paper sheet or non-woven, the veneered element 10 may be adhered, for example by an adhesive, to a panel or board in a separate step after pressing the wood veneer layer to the substrate. The board or panel may be a wood-based panel such as MDF, HDF, particleboard etc., or plywood. The substrate may be thermoplastic board.

A method of producing a veneered element 20 in form of a panel will now be described with reference to FIG. 3. In the embodiment described with reference to FIGS. 3-4, the substrate 1 comprises at least one intermediate wood veneer layer 22, 23, 24. Thereby, the veneered element 20 forms a plywood panel comprising an uppermost wood veneer layer 21, three intermediate wood veneer layers 22, 23, 24, and a lowermost wood veneer layer 25. The plywood panel may be, or form part of, a furniture component, a building panel such as a floor panel, a ceiling panel, a wall panel, a door panel, a worktop, skirting boards, mouldings, edging profiles, etc.

Figure 3:
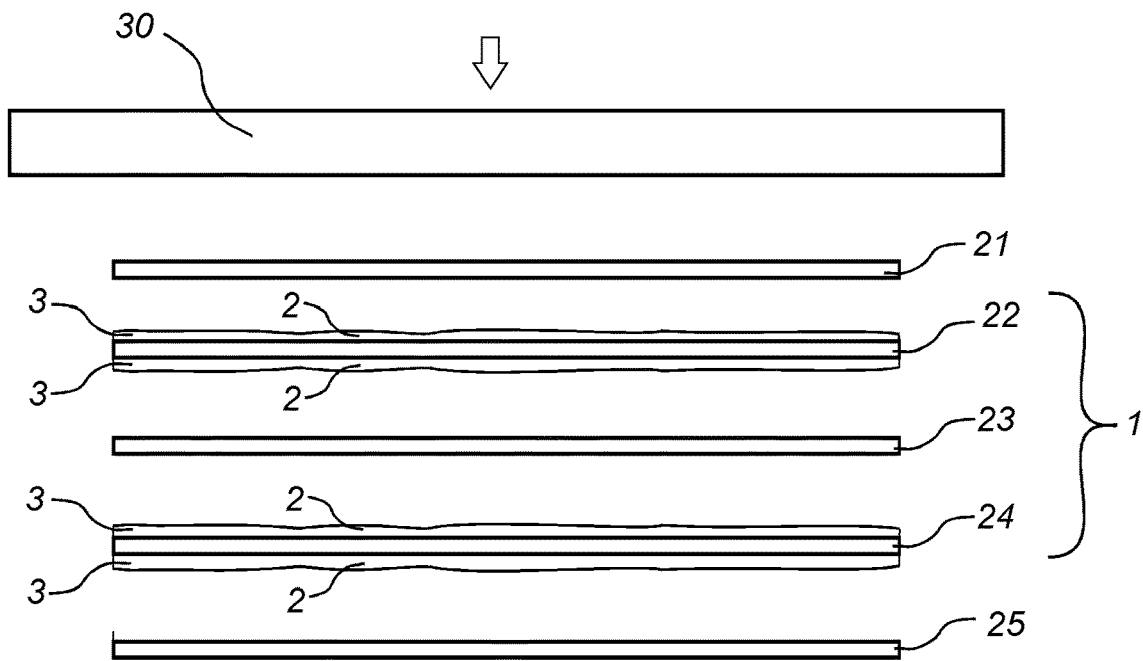
FIG. 3 shows a method of producing a veneered element.
Figure 3:
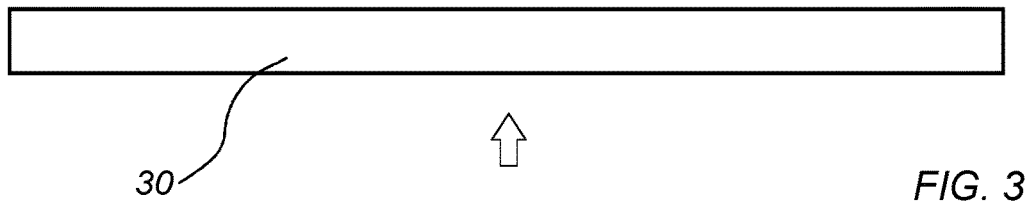

In FIG. 3 an uneven number of wood veneer layers or plies 21, 22, 23, 24, 25 are provided. Each wood veneer layer 21, 22, 23, 24, 25 may have a thickness of 0.2-4 mm such as about 0.2-1 mm. In the embodiment shown in FIG. 3, five wood veneer layers 21, 22, 23, 24, 25 are provided. The number of wood veneer layers 21, 22, 23, 24, 25 may be any uneven number exceeding three. The wood veneer layers 21, 22, 23, 24, 25 with their fibre direction are arranged in a crosswise manner. The wood veneer layers 21, 22, 23, 24, 25 may be arranged such that the fibre directions of the different layers are arranged perpendicularly. Depending on the number of layers, the layers may be arranged such that their fibre directions are arranged in steps of 45°.

For the uppermost wood veneer layer 21, and preferably also for the lowermost wood veneer layer 25, a high quality veneer may be used. For the intermediate wood veneer layers 22, 23, 24, a lower quality veneer may be used, i.e. a veneer quality containing more defects such as knots, discoloration, plugs, etc. The lowermost wood veneer layer 25 functions as a balancing layer or counteracting layer for the uppermost wood veneer layer 21 in order to balance the panel 20.

The wood veneer layers 21, 22, 23, 24, 25 may have a porous structure. Pores are formed by vessel elements of angiosperms such as hardwood being cut such that hollow channels are formed. Tracheids are formed by elongated cells in the xylem of gymnosperms such as softwood. An adhesive 2 is applied on a surface of the wood veneer layers 22, 23, 24, 25 adapted to face another surface of wood veneer layers, such that an adhesive layer 3 is formed between the wood veneer layers 22, 23, 24, 25. An adhesive 2 may be applied on both surfaces of the wood veneer layers, 22, 23, 24, adapted to face each other.

The adhesive 2 may be a thermosetting binder, a thermoplastic binder, or a combination of a thermosetting and thermoplastic binder. The thermosetting binder may be urea formaldehyde, phenol formaldehyde, melamine formaldehyde, polyurethane, polyester, emulsion polymer isocyanate (EPI), or combination thereof. The thermoplastic binder may be polyvinyl chloride (PVC), polyethylene (PE), polypropylene (PP), polyurethane (PU), polyvinyl alcohol (PVOH), polyvinyl butyral (PVB), and/or polyvinyl acetate (PVAc), or a combination thereof.

The adhesive 2 may be any type of glue. The adhesive 2 may be a hot melt. The adhesive 2 may be a pressure sensitive adhesive.

The adhesive 2 may be applied in liquid form or as a paste. The adhesive may be applied by a roller. The adhesive 2 may be applied by spraying, roller coating, curtain coating, hot melt coating, etc.

The adhesive 2 may be applied in powder form, preferably in dry powder form. The adhesive may be applied by scattering.

The adhesive 2 may also comprise additives such as ant-fungal additives, additives that improve water resistance properties, pigments, etc.

The adhesive 2 may be applied in form of a sheet or foil. The sheet may be impregnated with a binder as adhesive. The sheet may be paper sheet. The sheet may be a non-woven.

The adhesive 2 may be applied in an amount corresponding to a dry resin content of 10-200 g/m$^2$, preferably in an amount of 10-150 g/m$^2$, such as 25-75 g/m$^2$.

The amount of adhesive 2 applied may be different between the different wood veneer layers 22, 23, 24, 25. A larger amount of adhesive 2 may be applied for adhering the uppermost wood veneer layer 21 to an underlying wood veneer 22, compared to the amount of adhesive applied for adhering intermediate wood veneer layers 22, 23, 24 together. A larger amount of adhesive 2 may also be applied for adhering a lowermost wood veneer layer 25 to an overlying wood veneer layer 24, compared to the amount of adhesive 2 applied for adhering the intermediate wood veneer layers 22, 23, 24 together. In one embodiment, a larger amount of adhesive 2 is applied between the intermediate wood veneer layers 22, 23, 24.

When the wood veneer layers 21, 22, 23, 24, 25 are arranged in a stack of wood veneer layers, with adhesive layers 3 formed by the adhesive 2 between each wood veneer layer 21, 22, 23, 24, 25, pressure is applied to the wood veneer layers 21, 22, 23, 24, 25. Preferably, heat is applied together with applying pressure. The pressure may be applied by continuous press (not shown) or in a discontinuous press 30. Pressure applied may be at least 15 bar. The pressure may be applied during at least 15 s, preferably during at least 30 s, more preferably during at least 45 s. The temperature may be at least 150° C., such as 150-200° C.

When applying pressure, the wood veneer layers 21, 22, 23, 24, 25 are adhered to each other by the adhesive 2 such that a plywood panel 20 is formed. The plywood panel 20 will be described in more detail below with reference to FIGS. 4A-B.

The adhesive 2 impregnates the wood veneer layers 21, 22, 23, 24, 25 during pressing. The impregnation of the adhesive 2 into the wood veneer layers 21, 22, 23, 24, 25 will be described in more detail below with reference to FIGS. 4A-B.

When pressing, the wood veneer layers 21, 22, 23, 24, 25 are compressed. The wood veneer layers 21, 22, 23, 24, 25 may be compressed to a thickness being less or equal to 80% of their thickness prior to pressing such as less or equal to 70% such as less than or equal to 50% of their thickness prior to pressing. Preferably, at least the uppermost wood veneer layer 21 is compressed to a thickness being less or equal to 80% of its thickness prior to pressing such as less or equal to 70% such as less or equal to 50% of its thickness prior to pressing. The lowermost wood veneer layer 25 may be compressed to a thickness being less or equal to 80% of its thickness prior to pressing such as less or equal to 70% such as less or equal to 50% of its thickness prior to pressing. In one embodiment, each wood veneer layer 21, 22, 23, 24, 25 are compressed to a thickness being less or equal to 80% of each wood veneer layer thickness prior to pressing such as less or equal to 70% such as less or equal to 50% of their thickness prior to pressing. The density of the wood veneer layers 21, 22, 23, 24, 25 may be at least 1000 kg/m$^3$ after pressing. Preferably, at least the uppermost wood veneer layer 21 and/or the lowermost wood veneer layer 25 has a density of at least 1000 kg/m$^3$ after pressing. Thereby, by obtaining a remaining compression and high density of at least one of the wood veneer layers 21, 22, 23, 24, 25, a plywood panel 20 having high strength is formed.

Due to the binder in the adhesive 2 impregnating a portion of the wood veneer layer or layers 21, 22, 23, 24, 25, the compression of wood veneer layer or layers is maintained, or substantially maintained after pressing to a thickness being less or equal to 80% of the thickness of the wood veneer layer or layers prior to pressing, such as less or equal to 70% such as less or equal to 50% of the thickness of the wood veneer layer or layers prior to pressing. The binder in the adhesive 2, which impregnates the portion of the wood veneer layer or layers during pressing, fixes the portion of the wood veneer layer or layers into its compressed state after pressing, when the binder in the adhesive layer 3 has harden or cured. By thickness of the wood veneer layer 21, 22, 23, 24, 25 is meant in this application the distance between a first and second surface of the wood veneer layer 21, 22, 23, 24, 25.

The plywood panel 20 formed by the method described in FIG. 3 will now be described in more detail with reference to FIGS. 4A-B, to which reference now is made. After pressing, the adhesive 2 has impregnated a first portion 31 of the uppermost wood veneer layer 21. The first portion 31 is extending from a first surface 35 of the uppermost wood veneer layer 21, facing the adjacent wood veneer layer 22, and into the uppermost wood veneer layer 21. The first portion 31 may extend from the first surface 35 into at least 10% of the thickness of the uppermost wood veneer layer 21. Preferably, the first portion 31 may extend from the first surface 35 into at least 20% of the thickness of the uppermost wood veneer layer 21, more preferably into at least 30%, most preferably at least 40%, of the thickness of the uppermost wood veneer layer 21. The adhesive 2 from the adhesive layer 3 has flowed through pores or tracheids of the wood veneer. The thickness of the uppermost wood veneer layer 25 referred to is measured after pressing.

Preferably, the adhesive 2 has impregnated a first portion 33 of the lowermost wood veneer layer 25. The first portion 33 is extending from a first surface 37 of the lowermost wood veneer layer 25, facing the adjacent wood veneer layer 24, and into the lowermost wood veneer layer 25. The first portion 33 may extend from the first surface 37 into at least 10% of the thickness of the lowermost wood veneer layer 25, preferably into at least 20%, more preferably into at least 30% and most preferably into at least 40% of the thickness of the lowermost wood veneer layer 25.

In order to form a high strength plywood panel 20, the adhesive 2 may impregnate a first portion of each wood veneer layer 21, 22, 23, 24, 25. The first portion is extending from a surface of the wood veneer layers 21, 22, 23, 24, 25 facing an adjacent wood veneer layer. In one embodiment, each wood veneer layer 21, 22, 23, 24, 25, the first portion 31, 33 is extending into at least 10% of the thickness of each wood veneer layer 21, 22, 23, 24, 25. Preferably, the first portion 31, 33 is extending into at least 20%, more preferably into at least 30%, and most preferably into at least 40% of the thickness of each wood veneer layer 21, 22, 23, 24, 25.

In one embodiment, the adhesive 2 has impregnated into portions of each of said intermediate wood veneer layer 22, 23, 24. The total thickness of impregnated portions is at least 20%, preferably at least 40%, and more preferably at least 60%. Adhesive may have impregnated a first portion of each of said intermediate wood veneer layer 22, 23, 24, facing the uppermost wood veneer layer, and in a second portion of each of said intermediate wood veneer layer 22, 23, 24, facing the lowermost wood veneer layer. The total thickness of the first and second portion may be at least 20%, preferably at least 40%, and more preferably at least 60% of the thickness of each intermediate wood veneer layer 22, 23, 24. A second surface 36 of the uppermost wood veneer layer 21, opposite the first surface 35, may be substantially free from adhesive 2 from the adhesive layer 3. The second surface 36 of the uppermost wood veneer layer 21 may be free from any adhesive or resin. Preferably, also a second surface of the lowermost wood veneer layer 25 is substantially free from adhesive 2 from the adhesive layer 3. The second surface of the lowermost wood veneer layer 25 may be free from any adhesive or resin.

A second portion 32 extending from the second surface 36 of the uppermost wood veneer layer 21, opposite the first surface 35, and into the uppermost wood veneer layer 21 may be substantially free from adhesive 2 from the adhesive layer 3. The second surface 36 of the uppermost wood veneer layer 21 is an upper surface of the uppermost wood veneer 21, not being adhered to any other wood veneer layer. Preferably, the second portion 32 of the uppermost wood veneer layer 21 is free from any adhesive or resin. By substantially free from adhesive 2 from the adhesive layer 3 is meant that less than 40% of the pores or tracheids of the second portion 32 of the uppermost wood veneer layer 21 are filled with adhesive 2. Preferably, less than 30% of the pores or tracheids of the second portion 32 of the uppermost wood veneer layer 21 are filled with, and more preferably less than 20% of the pores or tracheids of the second portion 32 of the uppermost wood veneer layer 21 are filled with adhesive. Pores and tracheids only form a minor part, such as less than x %, of the material of the wood veneer. Larger openings than pores or tracheids in the uppermost wood veneer, such as cracks and holes, may be contain adhesive from the adhesive layer, and may be at least be partially filled with adhesive. Cracks and holes are not considered as pores or tracheids.

By substantially free from adhesive 2 from the adhesive layer 3 is meant that less than 40% of the pores or tracheids of the wood veneer are filled with adhesive 2. Preferably, less than 30% of the pores or tracheids of the wood veneer are filled with, and more preferably less than 20% of the pores or tracheids of the wood veneer are filled with adhesive 2. Larger openings than pores or tracheids in the wood veneer, such as cracks and holes, may be contain adhesive 2 from the adhesive layer 3, and may be at least be partially filled with adhesive 2. Cracks and holes are not considered as pores or tracheids.

The second portion 32 of the uppermost wood veneer layer 21 being substantially free from adhesive 2 is preferably extending from the second surface 36 of the uppermost wood veneer layer 21 and into at least 5% of the thickness of the uppermost wood veneer layer 21. Preferably, the second portion 32 is extending from the second surface 36 of the uppermost wood veneer layer 21 and into at least 10% of the thickness of the uppermost wood veneer layer 21, more preferably into at least 20% of the thickness of the uppermost wood veneer layer 21, and most preferably into at least 30% of the uppermost wood veneer layer 21. In one embodiment, the second portion 32 of the uppermost wood veneer layer 21 extends into at least 70% of the thickness of the uppermost wood veneer layer 21, such as at least 80% such as at least 90% of the thickness of the uppermost wood veneer layer 21. The thickness of the uppermost wood veneer layer 21 referred to is measured after pressing and prior to post-treatment, such as abrasive machining such as sanding.

Similarly, a second portion 34 of the lowermost wood veneer layer 25 may be substantially free from adhesive 2 from the adhesive layer 3. The definition of substantially free from adhesive 2 above is applicable also for the second portion 34 of the lowermost wood veneer layer 25. The second portion 34 of the lowermost wood veneer layer 25 may extend from a second surface 38 of the lowermost wood veneer layer 25, opposite the first surface 37, and into at least 5% of the thickness of the uppermost wood veneer layer 25. The second surface 38 of the lowermost wood veneer layer 25 is a lower surface of the lowermost wood veneer layer 25, not being adhered to any other wood veneer layer. Preferably, the second portion 34 is extending from the second surface 38 of the lowermost wood veneer layer 25 and into at least 10% of the thickness of the lowermost wood veneer layer 25, more preferably into at least 20% of the thickness of the lowermost wood veneer layer 25, and most preferably into at least 30% of the lowermost wood veneer layer 25. In one embodiment, the second portion 34 of the lowermost wood veneer layer 25 extends into at least 70% of the thickness of the lowermost wood veneer layer 25, such as at least 80% such as at least 90% of the thickness of the lowermost wood veneer layer 25. The thickness of the lowermost wood veneer layer 25 referred to is measured after pressing.

The second surface 36 of the uppermost wood veneer layer 21 is substantially free from adhesive 2. Thereby, surface treatment of the second surface 36, such as coating and/or lacquering, is facilitated, since substantially no adhesive 2 that may make adherence to the second surface 36 of the uppermost wood veneer layer 21 more difficult is present at the second surface 36.

The second surface 36 of the uppermost wood veneer layer 21 and/or the second surface of the lowermost wood veneer layer 25 may be treated prior to applying a protective layer. The second surface 36 of the uppermost wood veneer layer 21 and/or the second surface of the lowermost wood veneer layer 25 may be abrasively machined. The second surface 36 of the uppermost wood veneer layer 21 and/or the second surface of the lowermost wood veneer layer 25 may be sanded. Sanding is often performed prior to lacquering. If measured after abrasive machining such as sanding, the second surface 36 of the uppermost wood veneer layer 21 and/or the second surface of the lowermost wood veneer layer 25 is substantially free from adhesive 2 from the adhesive layer 3. In one embodiment, if measured after abrasive machining such as sanding, the second portion of the uppermost wood veneer layer 21 and/or of the lowermost wood veneer layer 25 may extend from the second surface of the uppermost wood veneer layer 21 and/or of the lowermost wood veneer layer 25 and into at least 0.5% of the thickness of the wood veneer layer 21, 25, preferably into at least 2% of the thickness of the wood veneer layer 21, 25, and more preferably into at least 5% of the thickness of the wood veneer layer 21, 25.

The second surface 36 of the uppermost wood veneer layer 21 and/or the second surface of the lowermost wood veneer layer 25 may be provided with a protective layer (not shown). The second surface 36 of the uppermost wood veneer layer 21 and/or the second surface of the lowermost wood veneer layer 25 may be coated with a coating, such as lacquered with one or more lacquer layers. The coating or lacquer may be an acrylate or methacrylate coating such as polyurethane coating. The coating or lacquer may comprise wear and/or scratch resistant particles. The protective layer may be an overlay paper comprising wear resistant particles. The protective layer may be a powder overlay, as described in WO2011/129755, comprising processed wood fibres, a binder and wear resistant particles applied as mix on the veneer surface. If the protective layer comprises or is an overlay paper or a powder overlay, the protective layer is preferably applied before applying pressure. Thereby, the protective layer is cured and attached to the uppermost wood veneer layer in the same step as adhering the wood veneer layers to each other.

The uppermost wood veneer layer 21 and/or the second surface of the lowermost wood veneer layer 25 may further be treated in different ways, for example brushed, oiled, waxed, etc. A protective coating (not shown) may also be applied to the uppermost wood veneer layer 21 and/or the second surface of the lowermost wood veneer layer 25 prior to pressing. In one embodiment, a wax powder is applied, for example, scattered, on the second surface 36 of the uppermost wood veneer layer 21 and/or the second surface of the lowermost wood veneer layer 25, prior to pressing. During pressing, the wax powder forms a protective coating of the uppermost wood veneer layer 21 of the uppermost wood veneer layer 25 and/or the second surface of the lowermost wood veneer layer 25.

In one embodiment, a primer, foil or sheet (not shown) is applied on the second surface 36 of the uppermost wood veneer layer 21 and/or the second surface of the lowermost wood veneer layer 25, prior or after pressing. The primer may be a print primer, a primer for preparing the wood veneer layer for lacquering, etc. The foil or sheet may be impregnated with a B staged thermosetting resin. If applied prior to pressing, material from the primer, foil or sheet may be pressed into pores or tracheids of the second surface of the uppermost wood veneer layer 21 and/or of the lowermost wood veneer layer 25 during pressing. Thereby, a counteracting force is obtained, preventing adhesive 2 from the adhesive layer 3 from impregnating into the second surface of the uppermost wood veneer layer 21 and/or of the lowermost wood veneer layer 25. The counteracting force may prevent adhesive 2 from the adhesive layer 3 from impregnating into the second portion of the uppermost wood veneer layer 21 and/or of the lowermost wood veneer layer 25.

A protective foil may also be applied on the second surface 36 of the uppermost wood veneer layer 21 and/or the second surface of the lowermost wood veneer layer 25 prior or after pressing. The protective foil may be thermoplastic foil such as PU (polyurethane) or PVC (polyvinyl chloride) foil.

As described above, the wood veneer layers 21, 22, 23, 24, 25 are maintained compressed compared to its original thickness after pressing. The thickness of the wood veneer layers 21, 22, 23, 24, 25 after pressing may be less than 80% of the thickness of the wood veneer layers 21, 22, 23, 24, 25 prior to pressing, and preferably less than 70% of the thickness of the wood veneer layers 21, 22, 23, 24, 25 prior to pressing.

Figure 4A:
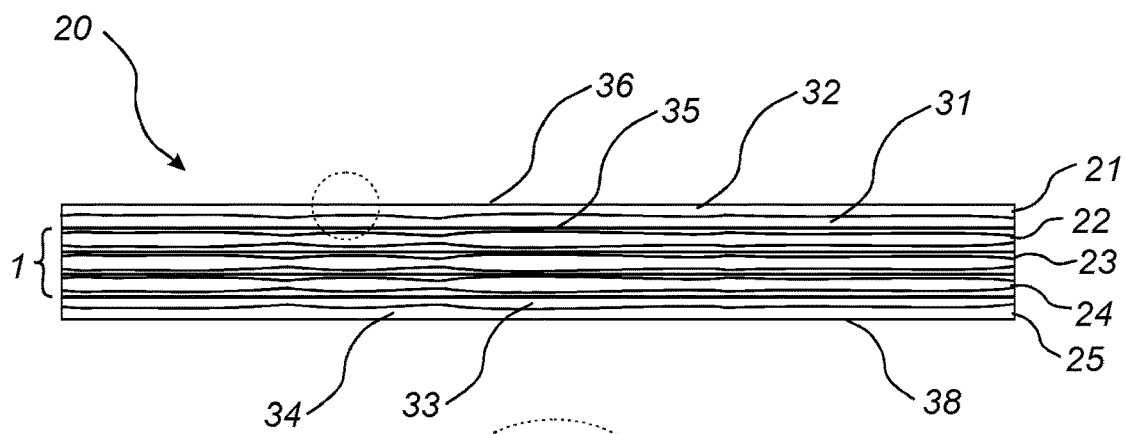
FIG. 4A shows a veneered element produced according to the method shown in FIG. 3.
Figure 4B:
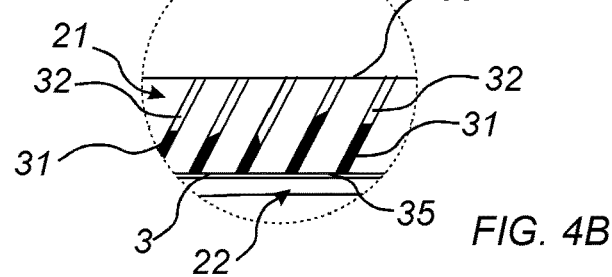
FIG. 4B shows an enlarged portion of the veneered element shown in FIG. 4A.

The plywood panel shown in FIGS. 4A-B may be provided with a mechanical locking system for joining with an adjacent panel.

It is contemplated that there are numerous modifications of the embodiments described herein, which are still within the scope of the invention as defined by the appended claims.

EXAMPLES

Example 1

An oak veneer layer having a thickness of 0.6 mm is arranged on a HDF core having a thickness of 9.8 mm. An adhesive layer comprising 42.5 g/m$^2$ melamine formaldehyde resin, as measured as dry resin content, is arranged between the oak veneer layer and the HDF core. The oak veneer layer is pressed to the HDF core with a pressure of 40 bar during 35 seconds at 180° C. After pressing, melamine formaldehyde resin is present in a lower portion of the oak wood veneer layer facing the HDF core. Pores of an upper surface and an upper portion of the oak veneer layer are substantially free from melamine formaldehyde resin from the adhesive layer after pressing.

Example 2

5 oak veneer layers, each having a thickness of 0.6 mm, are arranged crosswise on top of each other. Between each wood veneer layer, 150 g/m$^2$ of melamine formaldehyde resin, as measured as dry resin content, is applied as adhesive layers. In total, four adhesive layers are applied. The wood veneer layers are pressed together with a pressure of 10 bar at a temperature of 170° C. during 75 seconds to form a plywood. After pressing, melamine formaldehyde resin is present in a lower portion of the uppermost wood veneer layer facing an adjacent wood veneer layer. Pores of an upper surface and an upper portion of the uppermost wood veneer layer are substantially free from melamine formaldehyde resin from the adhesive layer after pressing.

Embodiments

1. A method of producing a veneered element (10; 20), comprising
providing a substrate (1) and a wood veneer layer (5; 21) having a first surface (14; 35) and a second surface (15; 36), the first surface (14; 35) being opposite to the second surface (15; 36),
arranging an adhesive layer (3) on the substrate (1) and/or on the first surface (14; 35) of the wood veneer layer (5; 21),
pressing the wood veneer layer (5; 21) to the substrate (1),
wherein, after pressing, adhesive (2) from the adhesive layer (3) is present in a first portion (11; 31) of the wood veneer layer (5; 21) extending from the first surface (14; 35) of the wood veneer layer (5; 21) and into at least 10% of the thickness of the wood veneer layer (5; 21),
wherein, after pressing, the second surface (15; 36) of the wood veneer layer (5; 21) is substantially free from adhesive (2) from the adhesive layer (3), and
wherein, after pressing, the wood veneer layer (5; 21) is compressed to a thickness being less than or equal to 80% of its thickness prior to pressing.

2. The method according to embodiment 1, wherein, after pressing, less than 40%, preferably less than 30%, more preferably less than 20%, of pores or tracheids of the wood veneer layer (5; 21) extending into the second surface (15; 36) of the wood veneer layer (5; 21), are filled with the adhesive (2) from the adhesive layer (3) up to the second surface (15; 36) of the wood veneer layer (5; 21).

3. The method according to embodiment 1 or 2, wherein, after pressing, a second portion of the wood veneer layer (5; 21) extending from the second surface (15; 36) of the wood veneer layer (5; 21) and into the wood veneer layer (5; 21) is substantially free from adhesive (2) from the adhesive layer (3).

4. The method according to embodiment 3, wherein, after pressing, less than 40% of pores or tracheids of the wood veneer layer (5; 21), preferably less than 30% of pores or tracheids of the wood veneer layer (5; 21), more preferably less than 20% of pores or tracheids of the wood veneer layer (5; 21), are filled with the adhesive (2) from the adhesive layer (3) in the second portion (12; 32) of the wood veneer layer (5; 21).

5. The method according to embodiment 3 or 4, wherein the second portion (12; 32) of the wood veneer layer (5; 21) is extending from the second surface (15; 36) of the wood veneer layer (5; 21) and into at least 0.5% of the thickness of the wood veneer layer (5; 21), preferably into at least 2% of the thickness of the wood veneer layer (5; 21), and more preferably into at least 5% of the thickness of the wood veneer layer (5; 21).

6. The method according to embodiment 3 or 4, wherein the second portion (12; 32) of the wood veneer layer (5; 21) is extending from the second surface (15; 36) of the wood veneer layer (5; 21) and into at least 70% of the thickness of the wood veneer layer (5; 21), preferably into at least 80% of the thickness of the wood veneer layer (5; 21), and more preferably into at least 90% of the thickness of the wood veneer layer (5; 21).

7. The method according to any one of embodiments 1-6, wherein the first portion (11; 31) is extending into at least 20% of the thickness of the wood veneer layer (5; 21), preferably into at least 30% of the thickness of the wood veneer layer (5; 21).

8. The method according to any one of embodiments 1-7, wherein pressing the wood veneer layer (5; 21) to the substrate (1) comprises applying heat and pressure.

9. The method according to any one of embodiments 1-8, wherein the pressure applied is at least 15 bar.

10. The method according to any one of embodiments 1-9, wherein, after pressing, the wood veneer layer (5; 21) is compressed to a thickness being less than or equal to 70% of its thickness prior to pressing.

11. The method according to any one of embodiments 1-10, wherein the substrate (1) comprises at least one wood veneer layer (22, 23, 24).

12. The method according to any one of embodiments 1-10, wherein the substrate (1) comprises a wood-based board. 13. The method according to any one of embodiments 1-10, wherein the substrate (1) comprises a sheet such as a paper sheet or sheet of non-woven.

14. The method according to any one of embodiments 1-13, wherein the adhesive layer (3) comprises a resin impregnated paper.

15. The method according to any one of embodiments 1-13, wherein the adhesive layer (3) comprises a thermoplastic binder, such as a hot melt or pressure sensitive adhesive.

16. The method according to any one of embodiments 1-13, wherein the adhesive layer (3) comprises a thermosetting binder.

17. The method according to embodiment 15 or 16, wherein the adhesive (2) is applied in powder form.

18. The method according to embodiment 15 or 16, wherein the adhesive (2) is applied in liquid form.

19. A veneered element (10; 20), comprising
a substrate (1),
a wood veneer layer (5; 21) having a first surface (14; 35) and a second surface (15; 36), the first surface (14; 35) being opposite to the second surface (15; 36),
an adhesive layer (3) adapted to adhere the first surface (14; 35) of the wood veneer layer (5; 21) to a surface of the substrate (1),
wherein adhesive (2) from the adhesive layer (3) is present in a first portion (11; 31) of the wood veneer layer (5; 21), extending from the first surface (14; 35) of the wood veneer layer (5; 21) and into at least 10% of the thickness of the wood veneer layer (5; 21),
wherein the second surface (15; 36) of the wood veneer layer (5; 21) is substantially free from adhesive (2) from the adhesive layer (3), and
wherein the wood veneer layer (5; 21) is compressed to a thickness being less than or equal to 80% of its original thickness.

20. The veneered element according to embodiment 19, wherein, less than 40%, preferably less than 30%, more preferably less than 20%, of pores or tracheids of the wood veneer layer (5; 21) extending into the second surface (15; 36) of the wood veneer layer (5; 21) are filled with the adhesive (2) from the adhesive layer (3) up to the second surface (15; 36) of the wood veneer layer (5; 21).

21. The veneered element according to embodiment 19 or 20, wherein, a second portion of the wood veneer layer (5; 21) extending from the second surface (15; 36) of the wood veneer layer (5; 21) and into the wood veneer layer (5; 21) is substantially free from adhesive (2) from the adhesive layer (3).

22. The veneered element according to embodiment 21, wherein less than 40% of pores or tracheids of the wood veneer, preferably less than 30% % of pores or tracheids of the wood veneer, more preferably less than 20% % of pores or tracheids of the wood veneer, are filled with the adhesive (2) from the adhesive layer (3) in the second portion (12; 32) of the wood veneer layer (5; 21).

23. The veneered element according to embodiment 21 or 22, wherein the second portion (12; 32) of the wood veneer layer (5; 21) is extending from the second surface (15; 36) of the wood veneer layer (5; 21) and into at least 0.5% of the thickness of the wood veneer layer (5; 21), preferably into at least 2% of the thickness of the wood veneer layer (5; 21) and more preferably into at least 5% of the thickness of the wood veneer layer (5; 21).

24. The method according to embodiment 21 or 22, wherein the second portion (12; 32) of the wood veneer layer (5; 21) is extending from the second surface (15; 36) of the wood veneer layer (5; 21) and into at least 70% of the thickness of the wood veneer layer (5; 21), preferably into at least 80% of the thickness of the wood veneer layer (5; 21), and more preferably into at least 90% of the thickness of the wood veneer layer (5; 21).

25. The veneered element according to any one of embodiments 19-24, wherein the first portion (11; 31) is extending into at least 20% of the thickness of the wood veneer layer (5; 21), and preferably into at least 30% thickness of the wood veneer layer (5; 21).

26. The veneered element according to any one of the embodiments 19-25, wherein the wood veneer layer (5; 21) has a density of at least 1000 kg/m$^3$.

27. The veneered element according to any one of the embodiments 19-26, wherein the substrate (1) comprises at least one wood veneer layer (22, 23, 24).

28. The veneered element according to any one of embodiments 19-26, wherein the substrate (1) comprises a wood-based board.

29. The veneered element according to any one of embodiments 19-26, wherein the substrate (1) comprises a sheet such as a paper sheet or sheet of non-woven.

30. The veneered element according to any one of the embodiments 19-29, wherein the adhesive layer (3) comprises a resin impregnated paper.

31. The veneered element according to any one of the embodiments 19-29, wherein the adhesive layer (3) comprises a thermosetting binder.

32. The veneered element according to any one of the embodiments 19-29, wherein the adhesive layer (3) comprises a thermoplastic binder, such as a hot melt or pressure sensitive adhesive.

33. A method of producing a veneered element (10; 20), comprising
providing a substrate (1) and a wood veneer layer (5; 21) having a first surface (14; 35) and a second surface (15; 36), the first surface (14; 35) being opposite to the second surface (15; 36),
arranging an adhesive layer (3) on the substrate (1) and/or on the first surface (14; 35) of the wood veneer layer (5; 21),
pressing the wood veneer layer (5; 21) to the substrate (1),
wherein, after pressing, adhesive (2) from the adhesive layer (3) is present in a first portion (11; 31) of the wood veneer layer (5; 21) extending from the first surface (14; 35) of the wood veneer layer (5; 21) into the wood veneer layer (5; 21),
wherein, after pressing, the second surface (15; 36) of the wood veneer layer (5; 21) is substantially free from adhesive (2) from the adhesive layer (3), and
wherein, after pressing, a second portion of the wood veneer layer (5; 21) extending from the second surface (15; 36) of the wood veneer layer (5; 21) and into at least 70% or the thickness of the wood veneer layer (5; 21) is substantially free from adhesive (2) from the adhesive layer (3).

34. A veneered element (10; 20), comprising
a substrate (1),
a wood veneer layer (5; 21) having a first surface (14; 35) and a second surface (15; 36), the first surface (14; 35) being opposite to the second surface (15; 36),
an adhesive layer (3) adapted to adhere the first surface (14; 35) of the wood veneer layer (5; 21) to a surface of the substrate (1),
wherein adhesive (2) from the adhesive layer (3) is present in a first portion (11; 31) of the wood veneer layer (5; 21), extending from the first surface (14; 35) of the wood veneer layer (5; 21) into the wood veneer layer (5; 21),
wherein the second surface (15; 36) of the wood veneer layer (5; 21) is substantially free from adhesive (2) from the adhesive layer (3), and
wherein a second portion of the wood veneer layer (5; 21) extending from the second surface (15; 36) of the wood veneer layer (5; 21) and into at least 70% or the thickness of the wood veneer layer (5; 21) is substantially free from adhesive (2) from the adhesive layer (3).

The invention claimed is:

1. A veneered element, comprising
a substrate,
a compressed wood veneer layer having a first surface and a second surface, the first surface being opposite to the second surface,
an adhesive layer adapted to adhere the first surface of the compressed wood veneer layer to a surface of the substrate,
wherein adhesive from the adhesive layer is present in a first portion of the compressed wood veneer layer, extending from the first surface of the compressed wood veneer layer and into at least 10% of the thickness of the compressed wood veneer layer, the first portion being locked in a compressed state of the first portion by the adhesive, such that the first portion maintains a thickness of less than or equal to 80% of its original thickness,
wherein the second surface of the compressed wood veneer layer is substantially free from adhesive from the adhesive layer, wherein a second portion of the compressed wood veneer layer extending from the second surface of the compressed wood veneer layer and into the compressed wood veneer layer is substantially free from adhesive from the adhesive layer, such that the second portion is unlocked in a compressed state of the second portion, such that the second portion is allowed to increase in thickness beyond a value that is less than or equal to 80% of its original thickness, and
wherein the compressed wood veneer layer has a density of at least 1000 kg/m$^3$.

2. The veneered element according to claim 1, wherein, less than 40% of pores or tracheids of the compressed wood veneer layer extending into the second surface of the compressed wood veneer layer are filled with the adhesive from the adhesive layer up to the second surface of the compressed wood veneer layer.

3. The veneered element according to claim 1, wherein less than 40% of pores or tracheids of the compressed wood veneer are filled with the adhesive from the adhesive layer in the second portion of the compressed wood veneer layer.

4. The veneered element according to claim 1, wherein the second portion of the compressed wood veneer layer is extending from the second surface of the compressed wood veneer layer and into at least 0.5% of the thickness of the compressed wood veneer layer.

5. The veneered element according to claim 1, wherein the second portion of the compressed wood veneer layer is extending from the second surface of the compressed wood veneer layer and into at least 70% of the thickness of the compressed wood veneer layer.

6. The veneered element according to claim 1, wherein the first portion is extending into at least 20% of the thickness of the compressed wood veneer layer.

7. The veneered element according to claim 1, wherein the substrate comprises at least one wood veneer layer.

8. The veneered element according to claim 1, wherein the substrate comprises a wood-based board.

9. The veneered element according to claim 1, wherein the substrate comprises a sheet.

10. The veneered element according to claim 1, wherein the adhesive layer comprises a resin impregnated paper.

11. The veneered element according to claim 1, wherein the adhesive layer comprises a thermosetting binder.

12. The veneered element according to claim 1, wherein the adhesive layer comprises a thermoplastic binder.

13. A veneered element, comprising
a substrate,
a compressed wood veneer layer having a first surface and a second surface, the first surface being opposite to the second surface,
an adhesive layer adapted to adhere the first surface of the compressed wood veneer layer to a surface of the substrate,
wherein adhesive from the adhesive layer is present in a first portion of the compressed wood veneer layer, extending from the first surface of the compressed wood veneer layer into the compressed wood veneer layer, the first portion being locked in a compressed state of the first portion by the adhesive, such that the first portion maintains a thickness of less than or equal to 80% of its original thickness,
wherein the second surface of the compressed wood veneer layer is substantially free from adhesive from the adhesive layer,
wherein a second portion of the compressed wood veneer layer extending from the second surface of the compressed wood veneer layer and into at least 70% of the thickness of the compressed wood veneer layer is substantially free from adhesive from the adhesive layer, such that the second portion is unlocked in a compressed state of the second portion, such that the second portion is allowed to increase in thickness beyond a value that is less than or equal to 80% of its original thickness, and
wherein the compressed wood veneer layer has a density of at least 1000 $kg/m^3$.

14. The veneered element according to claim 1, wherein the adhesive layer is a powder layer.

15. The veneered element according to claim 13, wherein the adhesive layer is a powder layer.

* * * * *